United States Patent
Nunez et al.

(10) Patent No.: US 10,148,112 B2
(45) Date of Patent: Dec. 4, 2018

(54) SYSTEM, METHOD, AND APPARATUS FOR CHARGING A BATTERY-POWERED ACCESSORY FROM A PRIMARY BATTERY-POWERED DEVICE

(71) Applicant: MOTOROLA SOLUTIONS, INC., Chicago, IL (US)

(72) Inventors: Diego I Nunez, Southwest Ranches, FL (US); Peter J Bartels, Loxahatchee, FL (US); Vitaliy Gurevich, Rishon Lesion (IL)

(73) Assignee: Motorola Solutions, Inc., Chicago, IL (US)

(*) Notice: Subject to any disclaimer, the term of this patent is extended or adjusted under 35 U.S.C. 154(b) by 245 days.

(21) Appl. No.: 15/278,067

(22) Filed: Sep. 28, 2016

(65) Prior Publication Data

US 2018/0090942 A1    Mar. 29, 2018

(51) Int. Cl.
*H02J 7/00* (2006.01)
*H04B 1/3827* (2015.01)

(52) U.S. Cl.
CPC ............ *H02J 7/007* (2013.01); *H02J 7/0045* (2013.01); *H04B 1/385* (2013.01)

(58) Field of Classification Search
CPC .......... H02J 7/007; H02J 7/008; H02J 7/0045; H02J 7/0052; H02J 7/0054
USPC ................................................. 320/103, 114
See application file for complete search history.

(56) References Cited

U.S. PATENT DOCUMENTS

| | | |
|---|---|---|
| 7,146,187 B2 | 12/2006 | Richards et al. |
| 7,424,312 B2 | 9/2008 | Pinder et al. |
| 2005/0075133 A1 | 4/2005 | Pinder et al. |
| 2008/0074077 A1 | 3/2008 | Wong et al. |
| 2009/0200982 A1 | 8/2009 | Hurtz |
| 2009/0253469 A1 | 10/2009 | Herezong |

(Continued)

FOREIGN PATENT DOCUMENTS

| | | |
|---|---|---|
| GB | 2535845 A | 8/2016 |
| WO | 2005031986 A2 | 4/2005 |

(Continued)

OTHER PUBLICATIONS

Office Action for Great Britain Patent Application No. GB1714413.0, dated Mar. 8, 2018; 7 pages.

*Primary Examiner* — Paul Dinh

(74) *Attorney, Agent, or Firm* — Baker Botts L.L.P.

(57) ABSTRACT

A system, method, and apparatus for charging primary battery-powered devices and battery-powered accessories tethered to the primary devices are disclosed. The two devices may include batteries of different types having different nominal voltages. A processing unit on the primary device may obtain state-of-charge information and other operating parameters of the batteries and may determine when to provide power to the accessory to charge its battery. The primary device may select its own battery, power provided by a charger to which it is coupled, or conditioned power as the source of charging energy provided to the accessory to charge its battery. Processing units on the two devices may adjust charging parameters to perform energy balancing while the batteries are simultaneously charged, based on operating parameters of the batteries, operating contexts of the devices, a charging prioritization scheme, or a current distribution scheme.

22 Claims, 8 Drawing Sheets

(56) References Cited

U.S. PATENT DOCUMENTS

| | | |
|---|---|---|
| 2011/0009172 A1 | 1/2011 | Song et al. |
| 2013/0159559 A1 | 6/2013 | Hess |
| 2013/0336506 A1 | 12/2013 | Prentice |
| 2014/0091623 A1 | 4/2014 | Shippy et al. |
| 2016/0099588 A1 | 4/2016 | Bae et al. |
| 2017/0179734 A1* | 6/2017 | Shiba .................... H02J 7/0045 |

FOREIGN PATENT DOCUMENTS

| | | |
|---|---|---|
| WO | 2005125165 A2 | 12/2005 |
| WO | 2008038057 A1 | 4/2008 |

* cited by examiner

SYSTEM, METHOD, AND APPARATUS FOR CHARGING A BATTERY-POWERED ACCESSORY FROM A PRIMARY BATTERY-POWERED DEVICE

BACKGROUND OF THE INVENTION

Many portable communication devices, such as two-way radios, are utilized in conjunction with different types of accessories of different complexities. The accessories include simple passive accessories, active accessories, and battery-powered accessories. Simple passive accessories can include audio capabilities, such as a remote speaker, a remote microphone or a remote push-to-talk button, or user interface indications, such as emergency indications. These accessories do not require power from the portable communication device, but may require audio configuration from the portable communication device. Active accessories typically include a processor, a data bus and an audio or video component. Active accessories may include displays and may be capable of processing information collected by an audio or video component. The electronic components of active accessories are typically powered by the portable communication device to which they are coupled during operation. A battery-powered accessory can include a variety of electronic components, such as a touch screen or other display component, a camera, a wireless transceiver, or sensing components, in addition to an audio component, a processor and a data bus. Battery-powered accessories may have features similar to those of active accessories or may be collaborative devices that can operate in a stand-alone fashion.

Next generation battery-powered accessories and collaborative devices, such as video speaker microphones, presently require individual dedicated chargers for each device. However, there are situations in which it may not be feasible to have multiple independent chargers. For example, in a situation in which a portable communication device is charged using a vehicular charger, space for an additional accessory charger in the vehicle may be at a premium. Furthermore, a user, such as a first responder, could be separated from a dedicated accessory charger when the battery of an accessory needs to be charged, such as when the accessory reaches an End of Discharge state.

There exists a limitation with respect to functionality where no mechanisms currently exist for one charger to charge both a portable communication device and its accessory simultaneously via a single charge cable while balancing the energy provided to the two devices during the charging. This functionality typically cannot be achieved simply by "daisy chaining" the charging path.

Accordingly, there is a need for a system, method, and apparatus for simultaneously charging a primary battery-powered device and a battery-powered accessory while balancing the energy provided to the two devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
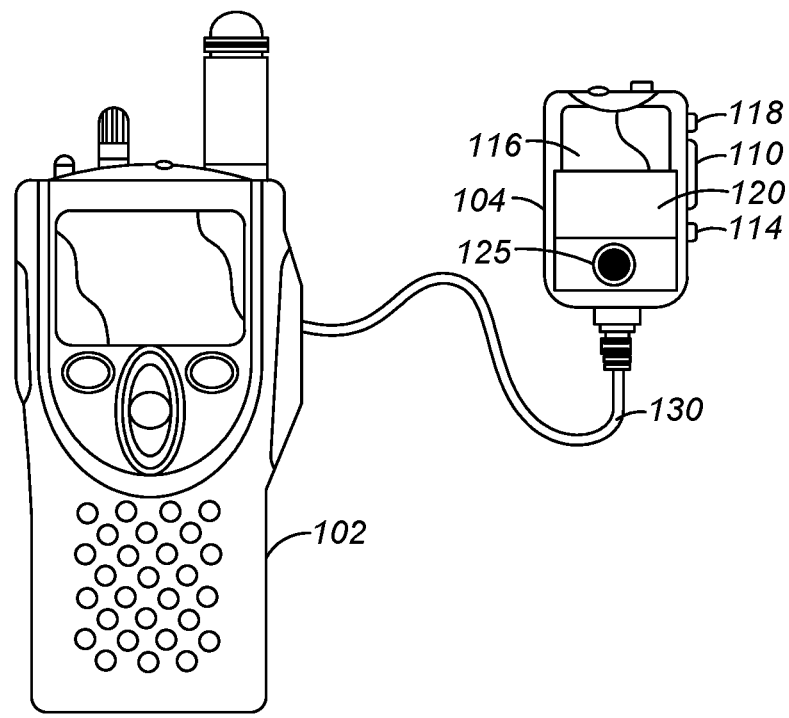
FIG. 1 is an illustration of an example system that includes a battery-powered communication device, a battery-powered accessory for the battery-powered communication device, and a charger for charging both the communication device and the accessory device, in accordance with some embodiments.
Figure 1:
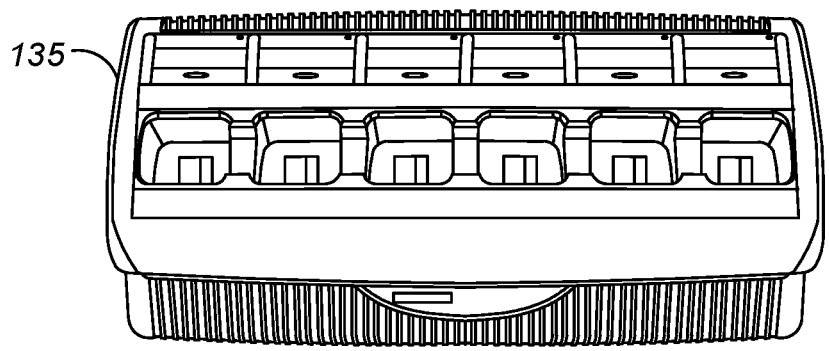

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are a system, method, and apparatus for charging a battery-powered accessory from a primary battery-powered device. In one embodiment, a disclosed electronic device includes a primary battery coupler to receive a primary battery, and an accessory interface configured to support a wired connection to a power port, a ground port, and at least one data channel of a battery-powered accessory. The electronic device also includes a processing unit, which includes circuitry to obtain, from the battery-powered accessory via the data channel, a plurality of operating parameters of an accessory battery of the battery-powered accessory. The operating parameters of the accessory battery include a state-of-charge of the accessory battery. The processing unit also includes circuitry to initiate, dependent on the state-of-charge of the accessory battery, an operation to charge the accessory battery, and to determine, dependent on the plurality of operating parameters of the accessory battery, a charging voltage to be applied to charge the accessory battery. The electronic device also includes circuitry to provide, via the wired connection, power to the battery-powered accessory to charge the accessory battery. The power provided to the battery-powered accessory is dependent on the determined charging voltage.

In one embodiment, a disclosed method of operating a battery-powered device includes obtaining, from a battery-powered accessory coupled to the battery-powered device through a wired connection to a power port, a ground port, and at least one data channel of the battery-powered accessory, a plurality of operating parameters of an accessory battery of the battery-powered accessory. The operating parameters of the accessory battery include a state-of-charge of the accessory battery. The method also includes initiating, dependent on the state-of-charge of the accessory battery, an operation to charge the accessory battery, and determining, dependent on the plurality of operating parameters of the accessory battery, a charging voltage to be applied to charge the accessory battery. The method further includes providing, via the wired connection, power to the battery-powered accessory to charge the accessory battery. The power provided to the battery-powered accessory is dependent on the determined charging voltage.

In one embodiment, a disclosed system includes a primary battery-powered device and a battery-powered accessory. The primary battery-powered device includes a primary battery coupler to receive a primary battery, an accessory interface, a primary processing unit, and a primary power control circuit. The battery-powered accessory is coupled to the accessory interface of the primary battery-powered device through a wired connection between to a power port, a ground port, and at least one data channel of the battery-powered accessory. The battery-powered accessory is one of a plurality of interchangeable battery-powered accessories. The battery-powered accessory includes an accessory battery coupler to receive an accessory battery, an accessory processing unit, and an accessory power control circuit. The primary processing unit includes circuitry to obtain, from the battery-powered accessory via the data channel, a plurality of operating parameters of the accessory battery. The operating parameters of the accessory battery include a state-of-charge of the accessory battery. The primary processing unit also includes circuitry to initiate, dependent on the state-of-charge of the accessory battery, an operation to charge the accessory battery, and to determine, dependent on the plurality of operating parameters of the accessory battery, a charging voltage to be applied to charge the accessory battery. The primary power control circuit includes circuitry to provide, via the wired connection, power to the battery-powered accessory to charge the accessory battery. The power provided to the battery-powered accessory is dependent on the determined charging voltage. The accessory power control circuit includes circuitry to charge the accessory battery using the power provided by the primary power control circuit.

In at least some embodiments of the present disclosure, the systems, methods, and apparatus described herein for simultaneously charging a primary battery-powered device and a battery-powered accessory, such as a two-way radio and an accessory thereof, may employ configurable mechanisms for prioritizing the charging of the primary battery-powered device and the battery-powered accessory and for intelligently balancing the distribution of charge between these two devices. Unlike in systems that employ existing daisy-chain charging techniques, the systems described herein may include communication mechanisms to enable the devices to share operating parameters of their respective batteries, including the state-of-charge of the batteries and other battery data relevant to battery charging operations. These operating parameters may be shared over a wired connection between the devices or over a wireless connection between the devices, in different embodiments. This information may then be used to determine when and how the devices are to be charged.

In at least some embodiments, the primary battery-powered devices descried herein may include mechanisms for charging their accessories using existing energy from batteries of the primary battery-powered devices that act as host devices, or by relaying energy from external power sources, such as external chargers, to the primary battery-powered devices, which then pass it to their accessories. In some cases, the primary battery-powered devices described herein may perform conditioning of the energy from an external charger, such as a voltage translation, to make the original source of charging energy compatible with the batteries of the primary battery-powered devices and the accessory. These techniques may provide flexibility for accessory charging and increased perceived customer value. For example, users employing a wired radio-to-accessory configuration may benefit from being able to simultaneously charge the batteries of the accessory and the radio from a single charger. In another example, where a large number of paired two-way radios and collaborative accessory devices are used, such as in a fire hall or police barracks, the reduction in the number of charger units required to charge these devices may be considered advantageous by rank and file users as well as by communications officers.

Referring now to FIG. 1, there is provided a schematic illustration of an example system 100 including a battery-powered communication device 102 with a battery-powered accessory 104, and a multi-unit charger 135 for charging both the communication device and the accessory device, in accordance with some embodiments. In this example, battery-powered communication device 102 is a two-way radio and battery-powered accessory 104 is a video speaker microphone, or body camera. Note that the battery-powered communication device 102, battery-powered accessory 104, and multi-unit charger 135 are not drawn to scale, and that at least some of the receptacles of the multi-unit charger 135 may be capable of receiving the battery-powered communication device 102 when it is placed in the charger 135 for charging. It will be appreciated that the two-way radio and video speaker microphone accessory are depicted for illustrative purposes only and that the system may be implemented using another type of battery-powered communication device and accessory thereof. For example, in various embodiments, an interface of the two-way radio or another battery-powered communication device may support multiple interchangeable accessories including, but not limited to, remote speaker microphones, video speaker microphones or body cameras, headsets, push-to-talk pods, or any of a variety of sensor accessories. It will be appreciated that multi-unit charger 135 is depicted for illustrative purposes only and that the system may be implemented using another type of charger for the battery of battery-powered communication device 102, such as a single-unit charger, a vehicular charger, a wall charger, and the like. In this example embodiment, the two-way radio is configured to transmit and receive signals, and allows an operator thereof to have a conversation with other similar two-way radios operating on the same radio frequency or channel.

As illustrated in FIG. 1, battery-powered accessory 104 may be coupled to battery-powered communication device 102 through cable 130. In some embodiments, battery-powered accessory 104 may be capable of operating in conjunction with battery-powered communication device 102 over a wireless interface, but may be charged by power provided by battery-powered communication device 102 when coupled to battery-powered communication device 102 over cable 130. In other embodiments, battery-powered accessory 104 may be coupled to battery-powered communication device 102 over cable 130 when operating in conjunction with battery-powered communication device 102.

Cable 130 may route multiple analog signals or data carried on multiple digital channels between respective accessory interface connectors on battery-powered accessory 104 and battery-powered communication device 102. In some embodiments, the accessory interfaces may include general purpose input/output interfaces for exchanging digital information carried over cable 130. In some embodiments, communication over cable 130 may be implemented in accordance with a standard or custom interface system for communication devices and accessories thereof. At least one general purpose input/output pin of these interfaces may be programmed to detect when the battery-powered accessory 104 is coupled to the battery-powered communication device 102. In some embodiments, the accessory interfaces may also include one or more analog-to-digital convertors for translating analog signals sent and received over cable 130 into digital signals to be processed on the battery-powered communication device 102 or on the battery-powered accessory 104.

In various embodiments, cable 130 may be implemented in accordance with any standard or custom device interface or communication protocol. For example, in one embodiment, cable 130 may be implemented according to the universal serial bus (USB) 2.0 standard. Note that, according to a power control scheme defined for the USB2.0 standard, power may be delivered over a USB-compliant cable through a line referred to as the "Vbus" line. According to the standard, the Vbus line is at a fixed voltage of 5V, and only the current through that line is adjustable. In at least some embodiments, the systems, methods, and apparatus described herein may allow a battery-powered communication device 102 to provide power to a battery-powered accessory 104 through cable 130 at a different voltage. For example, battery-powered communication device 102 may query battery-powered accessory 104 over cable 130 to determine the voltage at which it operates, and may internally switch the power provided to battery-powered accessory 104 over cable 130 to the determined voltage. In some embodiments, cable 130 may support more recently developed device interfaces and communication protocols, such as a USB Type-C connector or the USB 3.1 standard. However, battery-powered communication devices and accessories that include USB-Type C connectors and accept USB Type-C compliant cables may include internal circuitry that does not support the additional features of these standards due to the high cost and large size of the circuitry to implement this technology. In still other embodiments, cable 130 may be implemented according to a different standard device interface or communication protocol, or a custom device interface and communication protocol that supports the functionality of the systems described herein.

In some embodiments, when the battery-powered accessory 104 is detected as being coupled to the battery-powered communication device 102, the battery-powered communication device 102 obtains accessory configuration data from its internal memory (not shown in FIG. 1) or from an embedded memory (not shown in FIG. 1) of the battery-powered accessory 104. The battery-powered communication device 102 then performs operations to configure the battery-powered accessory and its own operations in accordance with the accessory configuration data.

In this example, battery-powered accessory 104 includes a battery (not shown in FIG. 1), an optional touch-screen display 120, an electronic processor (not shown in FIG. 1), a data bus (not shown in FIG. 1), an audio component 116, a push-to-talk button 110, a phone button 114, a Light Emitting Diode (LED), a video camera 112, audio/video processing circuitry, an emergency button 118, or sensors (not shown in FIG. 1). The LED (not shown in FIG. 1) may include a status indicator for indicating the current operational mode or the state-of-charge of the accessory's battery. The sensors may detect an emergency condition in a surrounding environment, such as a fire or the physical impairment of a person. In other embodiments, battery-powered accessory 104 may include more, fewer, or different elements to perform more, fewer, or different functions than those described in reference to the example system illustrated in FIG. 1.

The battery-powered accessory 104 may not require power from the battery-powered communication device 102 to be fully functional, as long as its battery is sufficiently charged. As described in more detail herein, when battery-powered accessory 104 is not sufficiently charged, it may be charged by power provided by battery-powered communication device 102 over cable 130. The power provided to battery-powered accessory 104 by battery-powered communication device 102 may be provided by a primary battery on battery-powered communication device 102, as unconditioned power provided by multi-unit charger 135 through battery-powered communication device 102, or as power provided to battery-powered communication device 102 by multi-unit charger 135 and pre-conditioned by battery-powered communication device 102 to meet the operating or charging specifications of battery-powered accessory 104.

Figure 2:
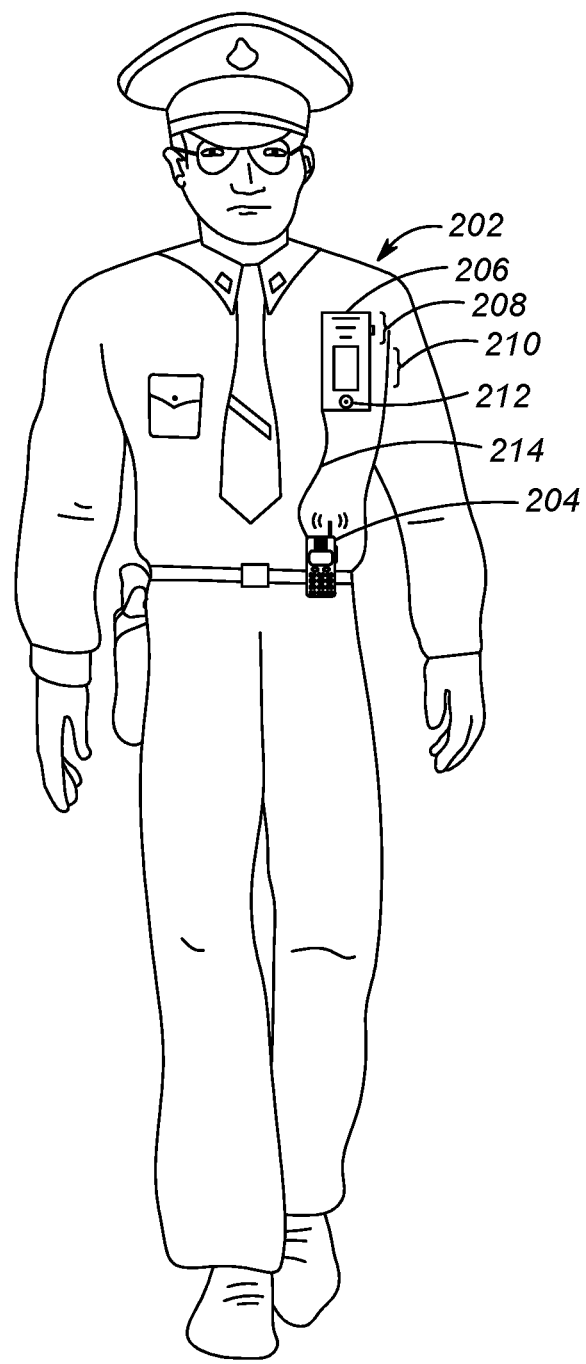
FIG. 2 is a system diagram illustrating a user wearing a battery-powered radio and a battered-powered accessory device for the radio that is chargeable by or through the radio, in accordance with some embodiments.

Referring now to FIG. 2, an example system 200 of wireless or wired devices that a user 202 may wear is illustrated. In FIG. 2, user 202 is depicted as a first responder. In this example, user 202 is wearing a battery-powered radio 204 and a battered-powered accessory 206 for the radio that is chargeable by or through battery-powered radio 204. Battery-powered radio 204 may be used for narrowband or broadband direct-mode or infrastructure communications, and may be operated in conjunction with battered-powered accessory 206. For example, in some embodiments, battery-powered radio 204 may be a wireless device used for infrastructure-supported media, such as voice, audio, video, and the like, for communication via a long-range wireless transmitter, as opposed to a short-range transmitter such as a Bluetooth, Zigbee, or near field communication (NFC) transmitter, or transceiver with other battery-powered radios in a same or different group of battery-powered radios as battery-powered radio 204. The long-range transmitter may have a transmit range on the order of miles, such as 0.5 to 50 miles, or 3 to 20 miles. In the example illustrated in FIG. 2, battery-powered radio 204 may form the hub of communication connectivity for the user 202, through which one or more accessory devices, such as a biometric sensor, an activity tracker, a weapon status sensor, a heads-up-display, or battery-powered accessory 206 may communicatively couple.

In order to communicate with and exchange audio information and other data with the battery-powered accessory 206 or other accessory devices, battery-powered radio 204 may contain one or more physical electronic ports, such as a USB port, an Ethernet port, an audio jack, or similar, for direct electronic coupling with battery-powered accessory 206 through cable 214, or may contain a short-range transmitter or transceiver for wirelessly coupling with the battery-powered accessory 206. The short-range transmitter may be a Bluetooth, Zigbee, or NFC transmitter having a transmit range on the order of 0.01 to 100 meters, or 0.1 to 10 meters. In some embodiments, battery-powered accessory 206 may communicate wirelessly with battery-powered radio 204 during operation, but may be coupled to battery-powered radio 204 through cable 214 when its battery is being charged by or through battery-powered radio 204. Battery-powered radio 204 and battery-powered accessory 206 may form part of a group communications architecture that allows a single portable radio, such as battery-powered radio 204, to communicate with one or more group members associated with a particular group of portable radios at a same time (not shown in FIG. 2).

Additional features provided by battery-powered accessory 206 may include a display screen 210 for displaying images, video, or text to the user 202. The display screen 210 may be, for example, a liquid crystal display screen or an organic light emitting display screen. In some embodiments, a touch sensitive input interface may be incorporated into the display screen 210, allowing the user 202 to interact with content provided on the display screen 210. A soft push-to-talk input may also be provided, for example, via such a touch interface. A video camera 212 may be provided on the battery-powered accessory 206, integrating an ability to capture images or video and store the captured image data or transmit the captured image data to battery-powered radio 204.

Additional features and functions not illustrated in FIG. 2 may also be integrated into the battery-powered accessory 206 including, but not limited to, an emergency indicator input button or switch, a voice recognition function, a voice to text conversion function, an internal audio/video storage function, a navigation function, a personal-area-network collaboration function, or a broadband communication function, among other possibilities.

Battery-powered radio 204 and battery-powered accessory 206 may be operable in a number of different modes, including a reduced-functionality mode in which only a subset of their functionality features are enabled, and one or more enhanced-functionality modes, in which one or more additional functionality features are enabled. In some embodiments, a supported reduced-functionality mode of battery-powered radio 204 may include a "charge only" mode, in which all or most functionality is disabled while the primary battery of the battery-powered radio 204 is charged. Battery-powered radio 204 may intelligently choose the mode in which it is to operate as a function of various operating parameters of its primary battery or an accessory battery of a battery-powered accessory 206 coupled to battery-powered radio 204. Similarly, battery-powered accessory 206 may intelligently choose the mode in which it is to operate as a function of various operating parameters of its accessory battery or the primary battery of a battery-powered radio 204 to which it is coupled. These determinations may be made, for example, based on a determination of the battery-energy remaining in one or more of the batteries (not shown in FIG. 2) and on an amount of energy consumed by various functionality features of the battery-powered radio 204 and the battery-powered accessory 206.

Battery-powered accessory 206 may not require power from the battery-powered radio 204 to be fully functional, as long as its battery is sufficiently charged. As described in more detail herein, when battery-powered accessory 206 is not sufficiently charged, it may be charged by power provided by battery-powered radio 204 over cable 214. The power provided to battery-powered accessory 206 by battery-powered radio 204 may be provided by a primary battery on battery-powered radio 204, as unconditioned power provided by an external charger through battery-powered radio 204, or as power provided to battery-powered radio 204 by an external charger and pre-conditioned by battery-powered radio 204 to meet the operating or charging specifications of battery-powered accessory 206. The external charger may be similar to multi-unit charger 135 illustrated in FIG. 1 or may be another type of charger suitable for charging the primary battery of battery-powered radio 204.

In at least some embodiments, the systems, methods, and apparatus described herein may provide the ability to charge two devices that have disparate battery topologies using a single charging source. In one example, a radio serving as an energy host device may include a battery with two or more cells configured in series and a dependent accessory may include a single-cell battery. The systems, methods, and apparatus described herein may provide to the energy host device the ability to relay direct charge power from its own battery, at its nominal battery voltage, or to pre-condition power from an external charger such that it is compatible with the battery parameters of the dependent accessory device. The systems, methods, and apparatus described herein may also provide a feedback network between two devices, and this feedback network may be utilized to optimize power transfer by relaying direct charger power, host battery power, or voltage adjustable switched-mode power supply (SMPS) conditioned power to a recipient device. In some embodiments, two portable devices may make use of a wired bridge through which the devices are coupled to each other to negotiate and synchronize charging information between them, which, when used in conjunction with various software algorithms executing on respective host processing units on the devices, may provide an intelligent method of energy balancing between host devices and dependent accessories in field operational environments. In some embodiments, the systems, methods, and apparatus described herein may implement a configurable charging priority mechanism that can set the relative priorities for charging for tethered pairs of radios and accessories that share an external charging source, particularly when the aforementioned source has limited power delivery capability.

In some embodiments, the techniques described herein may be applied to battery-powered accessories that include wireless communication capabilities when in operation, but that may also be used as wired devices. For example, the cables provided with these accessories may be used to couple them to a primary battery-powered device for charging by or though the primary battery-powered device. In some embodiments, operating parameters of the batteries of the two devices may be exchanged via a wireless protocol prior to or during charging.

In some embodiments, and for some types of primary battery-powered devices and corresponding accessories, users may place a primary battery-powered device to which an accessory is tethered in a standard charger for the primary battery-powered device, and the devices will be charged substantially simultaneously. In one example, a two-way radio used by a first responder may be placed in an external charger and a radio accessory tethered to the radio may be charged substantially simultaneously with the radio. As described in more detail below, the primary battery-powered device may determine the appropriate charging voltage to be applied when transferring energy to the accessory, and may balance the energy available for charging between the batteries of the two devices. In some embodiments, the rate at which each of the batteries is charged may depend on the state-of-charge of the two batteries and any applicable charging prioritization parameters or charge distribution parameters specified for the system or for particular pairs of primary battery-powered devices and accessories. In one example, when the battery of a radio is 90% charged, and the battery of an accessory of the radio is only 10% charged, the charging of the radio may be throttled down to provide more energy to the accessory for charging its battery.

In at least some embodiments, the techniques described herein for providing power from the battery of a primary battery-powered device to an accessory for charging its battery may also be used to charge the accessory in operation, such as when the primary battery-powered device is not coupled to an external charger. In such embodiments, when the accessory is performing an operation that consumes a relatively large amount of power, the primary battery-powered device may provide excess power to the accessory to charge its battery and extend its operating time. In one example, when an accessory worn on the user's lapel includes a video camera and the video camera is operating while the accessory is tethered to a two-way radio in the user's hand or on the user's belt, the radio may change to an operational mode in which excess power is transferred from the radio to the smaller, more power-intensive device on the user's lapel in order to charge the battery of the accessory, and to keep it charged as long as possible, during operation.

In at least some embodiments, the techniques described herein for providing power from the battery of a primary battery-powered device to an accessory for charging its battery may also be applied in situations in which the primary battery-powered device, such as a radio, is placed in a vehicular charger while an accessory is tethered to the primary battery-powered device. In such space-limited scenarios, the techniques described herein for simultaneous charging of the two devices may substantially simplify the end-user work environment. In one such embodiment, a two-way radio may be plugged into a car charger and a video camera accessory, which is in operation, may be propped up on the dashboard. The radio may be able to determine the operating context of the two devices, which may inform its decisions about when, whether, or how to charge the video camera accessory so that while it is in operation, it may also be charged and kept charged. In this way, the video camera accessory may be kept ready for stand-alone operation, in which it is not tethered to the radio, as needed. In some embodiments, a power management unit of a primary battery-powered device, such as a radio, may immediately initiate a charging operation for the radio battery and any accessories tethered to the radio in response to detecting that it has been placed in, or coupled to, an external charger.

Figure 3:
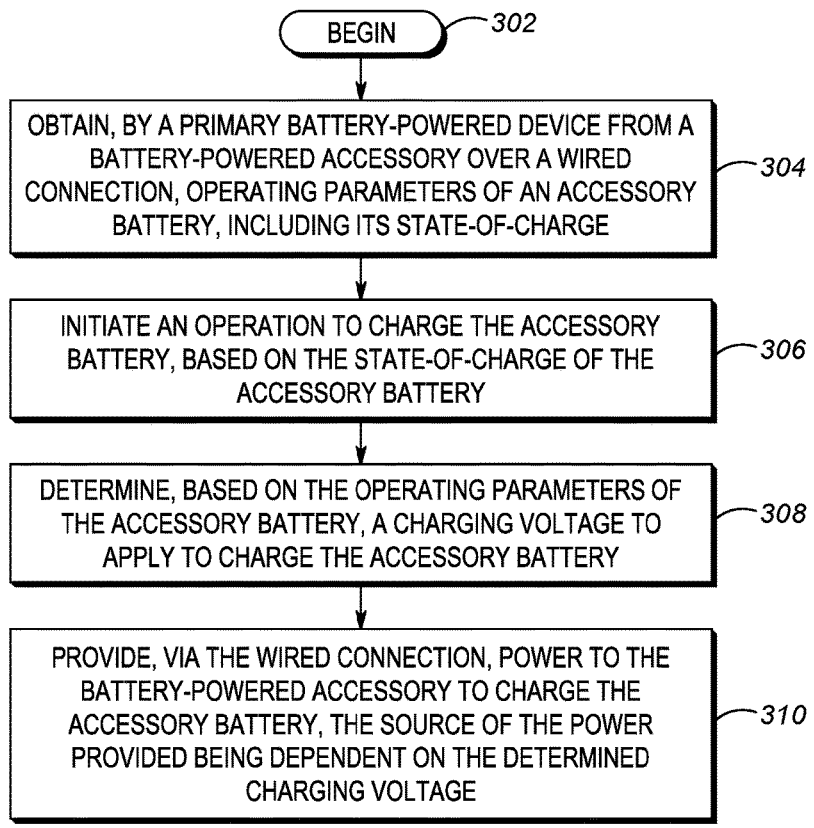
FIG. 3 is a flowchart illustrating a method of charging, by a primary battery-powered device, the battery of an accessory device, in accordance with some embodiments.

Referring now to FIG. 3, there is provided a flow diagram of an example method 300 for charging, by a primary battery-powered device, the battery of a battery-powered accessory device, in accordance with some embodiments. While a particular order of operations is indicated in FIG. 3 for illustrative purposes, the timing and ordering of such operations may vary where appropriate without negating the purpose and advantages of the examples set forth in detail throughout the remainder of this disclosure. A primary battery-powered device (for example, a battery-powered communication device 102 shown in FIG. 1 or a battery-powered radio 204 shown in FIG. 2) may execute method 300 following a power-on or reset event, at some predetermined periodic time period thereafter, in response to a trigger raised locally at the primary battery-powered device via an internal process or via an input interface, or in response to receiving a trigger from the battery-powered accessory device (for example, a battery-powered accessory 104 shown in FIG. 1 or a battery-powered accessory 204 shown in FIG. 2) to which it is communicatively coupled, or in response to detecting that the battery-powered accessory device has been communicatively coupled to the primary battery-powered device, in different embodiments.

In this example embodiment, method 300 begins with block 302 and continues with block 304, where a primary battery-powered device obtains, from a battery-powered accessory over a wired connection, operating parameters of an accessory battery, including its state-of-charge. In various embodiments, the primary battery-powered device may be coupled to the battery-powered accessory by a physically secured wired connection in accordance with a standard connector interface or in accordance with a custom connector interface. For example, the wired connection may be made using a connector that is compliant with a General Communications Architecture standard, a USB standard, or similar.

In some embodiments, in order to obtain the operating parameters of the battery in the battery-powered accessory device (also referred to as the accessory battery), a host processing unit on the primary battery-powered device may read the values of one or more operating parameters that are stored in a memory in the accessory battery. For example, many modern battery units include a memory device in which information that can affect the operation or performance of the battery, or the charging of the battery, is stored. This information may include, but is not limited to, the state-of-charge of the battery, the battery type, the battery topology, the available capacity of the battery, the peak charging capacity of the battery, the present charging capacity of the battery, a nominal voltage range for the battery, the temperature of the battery, an indication of the age of the battery, the number of charge-discharge cycles the battery has experienced, or a measure of impedance. Data representing the state-of-charge of the battery may be specified in terms of its voltage level or charge percentage, for example. Data representing the battery type may include an indication of its chemical makeup. Data representing the battery topology may include an indication of the number or arrangement of battery cells in the battery. Any or all of this information may be extracted from the memory of the accessory battery by the host processing unit and used by the host processing unit to make decisions about how and when to charge the accessory battery or the primary battery on the primary battery-powered device.

In at least some embodiments of the present disclosure, battery management logic or circuitry within the primary battery or within the accessory battery may implement any of a variety of mechanisms for determining the state-of-charge of the battery, including, but not limited to, a voltage measurement method, a current integration method, a pressure measurement method, or a specific gravity measurement. The state-of-charge determination may directly provide an estimated energy-remaining value in milliamp-hours (mAh) or milliwatt-hours (mWh), or the state-of-charge determination may provide a value that can be referenced against another mapping, such as a voltage-to-mAh mapping, that provides an estimated energy-remaining value in mAh or mWh. In one example, a state-of-charge determination may determine that the remaining battery energy of the accessory device is approximately 3000 mAh, or about 75% charged relative to a full energy-remaining amount of approximately 4000 mAh. Other values and other full-charge states are possible as well. In some embodiments, a battery-powered accessory may contain more than one battery, and a state-of-charge determination may aggregate remaining battery energy values from each of the two or more batteries of the battery-powered accessory.

In one example, the host processing unit of the primary battery-powered device may obtain information from an accessory battery indicating that it is a single series cell battery with a rated charge capacity of 2000 milliamp-hours, that it is three years old, and that it can, therefore, its actual charge capacity is only 1500 milliamp-hours. The host processing unit on the primary battery-powered device may take this information into consideration when determining whether and when to charge the accessory battery or when determining how to balance the power provided to the two devices when simultaneously charging both the primary battery and the accessory battery. As illustrated in this example, the systems, methods, and apparatus described herein may allow two battery-powered devices to communicate with each other, to exchange battery operating parameters and other information relevant to the charging of their respective batteries, and to optimize the distribution of energy between them. Using this approach, the source of the power provided by primary battery-powered device to the battery-powered accessory for charging the accessory battery and the charging voltage to be applied when charging the accessory battery may be dependent on the information exchanged. As described in more detail below, any of a variety of energy distribution schemes or charging prioritization schemes may be implemented in these systems, some of which may be dependent on the context in which the primary battery-powered device or the battery-powered accessory is operating.

Referring again to FIG. 3, in block 306, an operation is initiated to charge the accessory battery, based, at least in part, on the obtained state-of-charge of the accessory battery. In block 308 of method 300, a charging voltage to apply to charge the accessory battery is determined, based, at least in part, on the obtained operating parameters of the accessory battery. In block 310, power is provided to the battery-powered accessory to charge the accessory battery via the wired connection. The source of the power provided may be dependent, at least in part, on the determined charging voltage. For example, in one embodiment, when the determined charging voltage is within the nominal voltage range for the primary battery of the primary battery-powered device, power may be provided from the primary battery to the battery-powered accessory. When the determined charging voltage is within a nominal voltage range for power supplied by an external battery charger and the primary battery-powered device is coupled to the external battery charger, unconditioned power from the external battery charger may be provided to the battery-powered accessory by or through the primary battery-powered device. On the other hand, when the determined charging voltage is not within a nominal voltage range for power supplied by an external battery charger and the primary battery-powered device is coupled to the external battery charger, the primary battery-powered device may pre-condition power provided to it by the external battery charger and may provide the conditioned power to the battery-powered accessory.

Figure 4:
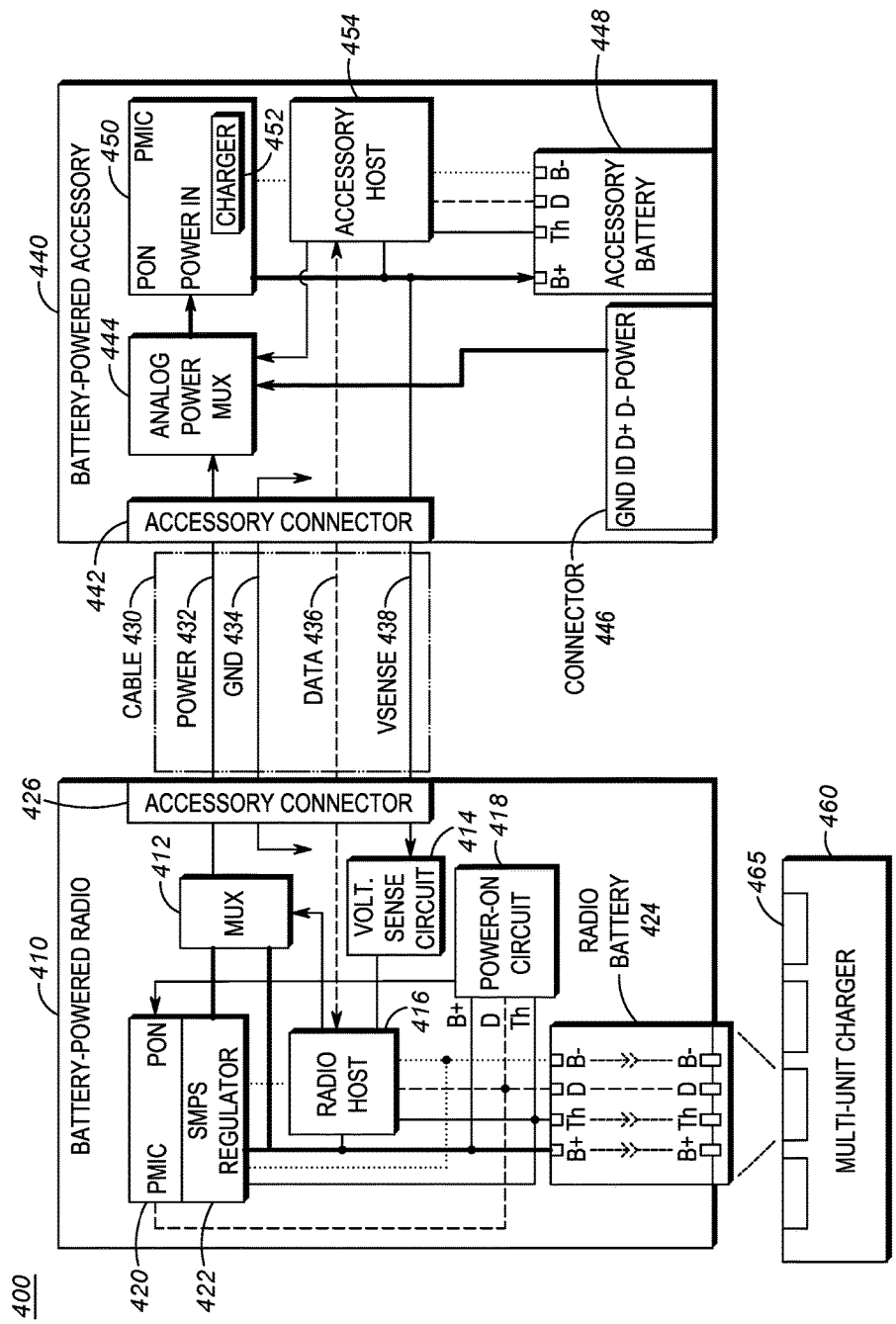
FIG. 4 is a block diagram illustrating an example system for simultaneously charging a primary battery-powered device and a battery-powered accessory, in accordance with some embodiments.

Referring now to FIG. 4, a block diagram of an example system 400 for simultaneously charging a primary battery-powered device and a battery-powered accessory is illustrated. In this example, system 400 includes a battery-powered radio 410, which acts as the primary battery-powered device in system 400, a battery-powered accessory 440 coupled to radio 410 via a cable 430, and a multi-unit charger 460. Note that battery-powered radio 410, battery-powered accessory 440, cable 430, and multi-unit charger 460 are not drawn to scale in FIG. 4. In this example, radio 410 and accessory 440 each include a respective accessory connector to support a wired connection over cable 430 between at least a power port, a ground port, and a data channel of the two devices. These connectors are shown in FIG. 4 as accessory connectors 426 and 442. In the illustrated embodiment, cable 430 includes a power line 432, a ground line (GND) 434, one or more data lines 436, and a voltage sense line, shown as Vsense line 438. In other embodiments, a cable through which a battery-powered accessory is coupled to a primary battery-powered device may include more, fewer, or different signals than those illustrated in FIG. 4. For example, in other embodiments, a cable through which a battery-powered accessory is coupled to a primary battery-powered device may include a minimum of six wires or as many as twelve wires. In various embodiments, cable 430 may be a 1-wire, $I^2C$ (inter-integrated circuit), or USB compliant cable. In general, any suitable mechanism may be employed to convey data and signals from radio 410 to accessory 440 and from accessory 440 to radio 410, and to provide power to accessory 440.

In at least some embodiments, the voltage sense line 438 may provide voltage-related feedback to radio 410. For example, as power is transferred from radio 410 to accessory 440, there may be $I^2R$ losses through cable 430 and accessory connectors 426 and 442. The voltage sense line 438 provides feedback about the battery voltage on accessory 440 to radio 410 that may be used to compensate for the loss of power. The feedback is provided to voltage sense circuit 414 on radio 410, which provides an indication of the power losses to radio host processing unit 416. In response to such an indication, radio host processing unit adjusts SMPS regulator 422 accordingly, in order to maintain the target voltage on accessory 440.

In the example embodiment illustrated in FIG. 4, battery-powered radio 410 includes a radio battery 424, terminals of which may be plugged into one of multiple receptacles 465 of multi-unit charger 460 for charging. In this example, the battery terminals support battery power lines, shown as B+ and B−, a data line, shown as D, and a thermal line, shown as Th, which represents the output of a temperature monitor on radio battery 424. In some embodiments, the data line may adhere to a custom or standard communication interface or protocol, such as the $I^2C$ standard or the 1-wire standard, to convey battery data to radio host processing unit 416. Battery-powered accessory 440 includes an accessory battery 448, the terminals of which are the same as those of radio battery 424. In this example, accessory battery 448 may be charged by a dedicated charger coupled to connector 446 (not shown in FIG. 4).

Radio battery 424 and accessory battery 448 may be implemented using any suitable battery chemistry and battery cell topology. For example, accessory battery 448 may be of the same battery type and cell topology as radio battery 424 or may be of a different type or a different topology than radio battery 424, in different embodiments. In one example, radio battery 424 may include two cells in series and accessory battery 448 may be a single-cell battery, although other battery topologies or combinations of topologies are possible. Radio battery 424 and accessory battery 448 may each include a non-rechargeable primary cell battery including, but not limited to, an alkaline battery or a zinc-carbon battery. Additionally or alternatively, radio battery 424 and accessory battery 448 may each include a rechargeable secondary cell battery including, but not limited to, a lithium-ion battery or a nickel-metal-hydride battery. In one example, radio battery 424 or accessory battery 448 may include a lithium-ion battery having an energy store in the range of 1000-5000 mAh. One or both of radio battery 424 or accessory battery 448 may include battery management logic (not shown in FIG. 4) for managing the battery, for calculating remaining energy-store values and other battery data, such as any or all of the operating parameters described herein as being obtainable from the radio and accessory batteries, and for responding to requests for remaining energy-store values and other battery data. In other embodiments, battery management logic may be provided external to the radio battery 424 or accessory battery 448.

In embodiments in which radio battery 424 is replaceable within radio 410 following its manufacturing, radio 410 may include a battery coupler into which radio battery 424 is installed for operation (not shown in FIG. 4). Similarly, in embodiments in which accessory battery 448 is replaceable within accessory 440 following its manufacturing, accessory 440 may include a battery coupler into which accessory battery 448 is installed for operation (not shown in FIG. 4). In at least some embodiments, radio battery 424 and accessory battery 448 may include respective memories in which battery data is stored (not shown in FIG. 4). In some embodiments, radio battery 424 may be a fixed, internal battery that is not replaceable in the field. This fixed, internal battery, which may or may not include memory for storing battery data, may be installed in a coupler within radio 410 during manufacturing or may be hard-wired into radio 410, in different embodiments. In some embodiments in which radio battery 424 is a fixed, internal battery, battery data may be stored in device memory of radio 410, rather than in battery memory. In some embodiments, accessory battery 448 may be a fixed, internal battery that is not replaceable in the field. This fixed, internal battery, which may or may not include memory for storing battery data, may be installed in a coupler within accessory 440 during manufacturing or may be hard-wired into accessory 440, in different embodiments. In some embodiments in which accessory battery 448 is a fixed, internal battery, battery data may be stored in device memory of accessory 440, rather than in battery memory.

In at least some embodiments, battery data, including various operating parameters of the batteries on radio 410 and accessory 440, may be exchanged between the respective host processing units 416 and 454 of the two devices over one or more data lines 436. For example, radio host processing unit 416 may obtain one or more operating parameters of accessory battery 448 over data lines 438. In some embodiments, the operating parameters of accessory battery 448 may be read from a memory within accessory battery 448 by radio host processing unit 416. In other embodiments, the operating parameters of accessory battery 448 may be read from a memory within accessory battery 448 by accessory host processing unit 454 and provided to radio host processing unit 416 over data lines 438. Radio host processing unit 416 may also obtain one or more operating parameters of radio battery 424 by reading them from a memory within radio battery 424 that stores battery data. The operating parameters of radio battery 424 or accessory battery 448 obtained by radio host processing unit 416 may include, but are not limited to, the state-of-charge of accessory battery 448, its battery type, its battery topology, the available capacity of the battery, the peak charging capacity of the battery, the present charging capacity of the battery, a nominal voltage range for the battery, the temperature of the battery, an indication of the age of the battery, the number of charge-discharge cycles the battery has experienced, or a measure of impedance.

In at least some embodiments, accessory host processing unit 454 may obtain one or more operating parameters of radio battery 424 over data lines 438. For example, in some embodiments, the operating parameters of radio battery 424 may be read from a memory within radio battery 424 by accessory host processing unit 454. In other embodiments, the operating parameters of radio battery 424 may be read from a memory within radio battery 424 by radio host processing unit 416 and provided to accessory host processing unit 454 over data lines 438. Accessory host processing unit 454 may also obtain one or more operating parameters of accessory battery 448 by reading them from a memory within accessory battery 448 that stores battery data. The operating parameters of radio battery 424 and accessory battery 448 obtained by accessory host processing unit 454 may include, but are not limited to, those described above. In embodiments in which one or more of the batteries is a fixed, internal battery, the operating parameters of each such fixed, internal battery may be read from on-board memory of the device in which the battery is installed.

In the example embodiment illustrated in FIG. 4, battery-powered radio 410 includes a power management unit or power management integrated circuit, shown as PMIC 420, SMPS regulator 422, a multiplexor 412, a host processing unit, shown as radio host 416, an accessory connector 426 configured to receive cable 430, voltage sense circuitry, shown as voltage sense circuit 414, and a power-on circuit 418. The SMPS regulator 422 may or may not be integrated into PMIC 420, in different embodiments.

Figure 5A:
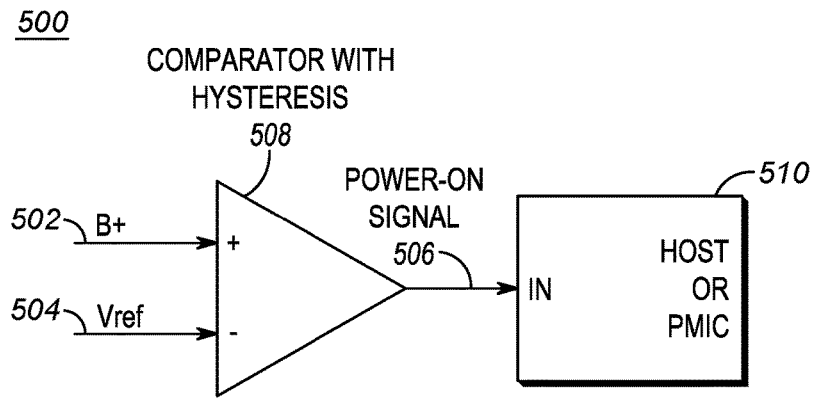
FIG. 5A is a schematic of an example power-on circuit, in accordance with some embodiments.
Figure 5B:
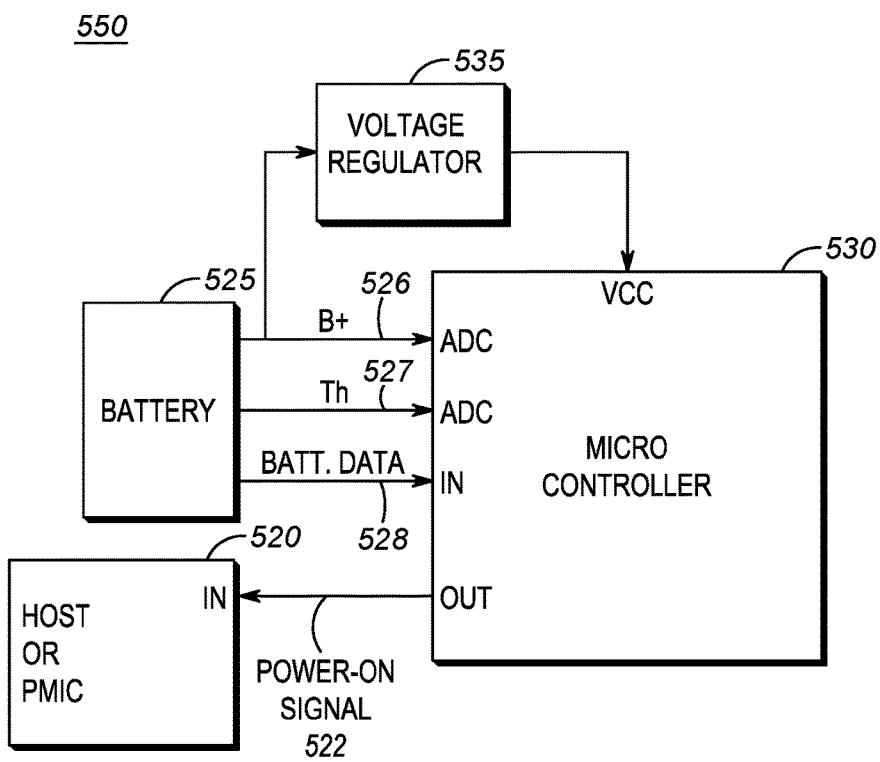
FIG. 5B is a schematic of another example power-on circuit, in accordance with some embodiments.

Power-on circuit 418 may include circuitry to determine when there is sufficient charge on radio battery 424 to enable other functionality features of radio 410. For example, in some embodiments, until and unless radio battery 424 meets a first threshold condition, radio 410 may be placed in a state of reduced functionality in which its primary function is to charge its battery. While in this state, radio 410 may be considered turned off, in that most or all of the functionality features of radio 410 are disabled. In the example embodiment illustrated in FIG. 4, once radio battery 424 meets the first threshold condition, power-on circuit 418 may issue a power-on signal to the power management unit of radio 410, shown as PMIC 420. In response to receiving the power-on signal, PMIC 420 may cause power to be turned on in at least a portion of radio 410. For example, power may be supplied to enough of the radio that radio host processing unit 416 will be able to execute program instructions to perform some or all of the methods described herein. Power-on circuit 418 may be a battery-induced power-on circuit, example embodiments of which are illustrated in FIGS. 5A and 5B and described below.

In the example embodiment illustrated in FIG. 4, the power lines, B+ and B−, and thermal line, Th of radio battery 424 are directly coupled to SMPS regulator 422. The output of SMPS regulator 422 is provided as an input to multiplexor 412. In this example embodiment, SMPS regulator 422 may be a 5V switch mode power supply regulator. In other embodiments, a battery-powered radio or other primary battery-powered device may include a different type of power supply or power supply regulator. In one embodiment, radio 410 may include a fixed power supply regulator, while in other embodiments, radio 410 may include a dynamically adjustable power supply regulator. In various embodiments, a power supply regulator such as SMPS regulator 422 may or may not be a component integrated within the power management unit of battery-powered radio or other primary battery-powered device.

In the example embodiment illustrated in FIG. 4, there is communication path between the radio host processing unit 416 and PMIC 420 over which they may exchange data. For example, in some embodiments, battery data may be obtained from radio battery 424 by PMIC 420 and provided to radio host processing unit 416 by PMIC 420 over this communication path. In such embodiments, the battery data may be obtained by radio host processing unit 416 indirectly through PMIC 420 rather than directory from radio battery 424. In some embodiments, accessory host processing unit 454 may obtain battery data for accessory battery 448 indirectly through PMIC 450 in a similar manner (not shown in FIG. 4).

In the example embodiment illustrated in FIG. 4, multiplexor 412 includes circuitry controlled by a select line output by radio host processing unit 416. This select line may be used to select the one of multiple power sources from which power is to be supplied to accessory 440 in order to charge its accessory battery. In this example, the inputs to multiplexor 412 include power provided by SMPS regulator 442 and power supplied directly from radio battery 424. In some embodiments, the power provided by SMPS regulator 442 and selected for delivery to accessory 440 may be power that was supplied by radio battery 424 and then pre-conditioned by SMPS regulator 442 for compatibility with accessory 440. In at least some embodiments, the selection of the source of power to be provided to accessory 440 may be determined by radio host processing unit 416 based, at least in part, on the operating parameters obtained from radio battery 424 and accessory battery 448. For example, the selection may be dependent on a determination, by radio host processing unit 416, of an appropriate charging voltage to be applied to charge accessory battery 448, a determination of whether the charging voltage is within the nominal voltage range for radio battery 424, a determination of whether the charging voltage is within a nominal voltage range for power supplied by multi-unit charger 460, or a determination of whether radio 410 is coupled to multi-unit charger 460.

In the example embodiment illustrated in FIG. 4, accessory 440 includes an analog power multiplexor 444, which may switch between the power line 432 of cable 430, when power is delivered to accessory 440 over power line 432, and power supplied from an external charger (not shown in FIG. 4) through connector 446.

In the example embodiment illustrated in FIG. 4, the power management unit of accessory 440, shown as PMIC 450, includes an internal charger 452, which may be used to charge accessory battery 448 using the power selected as the output of analog power multiplexor 444. In other embodiments, charger 452 may be a separate component of accessory 440 that is external to PMIC 450. In some embodiments, charger 452 may include a buck-boost convertor, or similar. In one embodiment, charger 452 may include a charger IC that can perform some rudimentary charging operations without the involvement of accessory host processing unit 454.

In one example, radio battery 424 may include two cells in series, nominally 8V, and accessory battery 448 may be a single-cell battery, nominally 4V. In this example, radio 410 may obtain battery operating parameters or other information from accessory 440 indicating that accessory battery 448 is a 4V battery, indicating whether or not it is fully charged, and so on. Based, at least in part, on this information and on one or more operating parameters of radio battery 424, radio host processing unit 416 may determine whether and when to provide power to accessory 440 to charge accessory battery 448, and may determine the appropriate source of the power to be provided to accessory 440 to charge accessory battery 448. In this example, radio host processing unit 416 may determine that the power to be provided to accessory 440 to charge accessory battery 448 should be power conditioned by SMPS regulator 422 to step the power provided by radio battery 424 down from 8V to 4V. Other accessories of radio 410 that are interchangeable with accessory 440 may include batteries with two cells in series. When one of these accessories is coupled to radio 410, radio host processing unit 416 may determine that the power to be provided to it to charge its accessory battery should be provided directly from radio battery 424. In another example, in an embodiment in which radio battery 424 includes two cells in parallel and accessory battery 448 is a single-cell battery, these batteries may use the same charging voltage. In this example, power for charging accessory battery 448 may be supplied directly from radio battery 424.

In some embodiments, based on the information obtained from accessory 440, one or more operating parameters of radio battery 424, the context in which these devices are operating, or an applicable charging prioritization or distribution scheme, radio host processing unit 416 may determine the portion of available current that is to be allocated for charging radio battery 424 or for performing other functions of radio 424 and the portion of the available current that is to be delivered to accessory 440 for charging accessory battery 448. Subsequently, such as in response to a change in the operating context of the devices, in response to a change in battery conditions or loading, or in response to obtaining updated operating parameters for one or both batteries, the relative portions of the available current allocated to each of the devices may be modified.

In various embodiments, radio host processing unit 416 may include hardware circuitry and logic for executing instructions to control any of the hardware elements of radio 410. For example, in one embodiment, radio host processing unit 416 may include a microprocessor and a memory storing program instructions that when executed by the microprocessor perform, in whole or in part, any of the methods described herein for simultaneously charging radio 410 and accessory 440. In other embodiments, radio host processing unit 416 may include a microcontroller, a system-on-chip, a field-programmable gate array, a programmable mixed-signal array, or, in general, any system or sub-system that includes nominal memory and that is capable of executing a sequence of instructions in order to control the hardware within radio 410.

Similarly, accessory host processing unit 454 may include hardware circuitry and logic for executing instructions to control any of the hardware elements of accessory 440. For example, in one embodiment, accessory host processing unit 454 may include a microprocessor and a memory storing program instructions that when executed by the microprocessor perform, in whole or in part, any of the methods described herein for simultaneously charging radio 410 and accessory 440. In other embodiments, accessory host processing unit 454 may include a microcontroller, a system-on-chip, a field-programmable gate array, a programmable mixed-signal array, or, in general, any system or sub-system that includes nominal memory and that is capable of executing a sequence of instructions in order to control the hardware within accessory 454.

Note that while FIG. 4 illustrates an example embodiment of a system 400 including a radio 410 and accessory 440 having particular combinations of hardware elements that are collectively configured to implement the simultaneous charging of radio 410 and accessory 440, in other embodiments, radio 410 and accessory 440 or, more generally, a primary battery-powered device and an accessory device thereof, may include more, fewer, or different hardware elements for implementing the simultaneous charging of a radio and its accessory or of other tethered pairs of battery-powered devices. In addition, radio 410 and accessory 440 or, more generally, a primary battery-powered device and an accessory device thereof, may include hardware elements not shown in FIG. 4 for implementing other functionality features of the two devices.

In one embodiment, a power-on circuit may take advantage of the fact that the state-of-charge of a battery is directly proportional to its unloaded terminal voltage, i.e., the open circuit voltage. For example, when a battery-powered device is turned off, it may, effectively, be considered an open circuit even when current in the range of few mA is flowing. Therefore, by monitoring the terminal voltage of the battery, changes in the state-of-charge may be observed. FIG. 5A is a schematic of a first power-on circuit 500, in accordance with such an embodiment. In this example embodiment, power-on circuit 500 includes a hysteretic comparator that monitors the battery voltage. When the battery voltage reaches a predetermined threshold voltage, the comparator trips and issues a power-on signal 506 to the corresponding host or the power management unit, shown as host or PMIC 510 in FIG. 5A. In response to receiving power-on signal 506, the power management unit 510 may cause power to be turned on in at least a portion of the corresponding battery-powered device. For example, some components in the device may be turned on to allow the host processing unit of the device to execute program instructions to perform some or all of the methods described herein.

In this example embodiment, circuit 500 includes a comparator 508 with hysteresis. The inputs to comparator 508 include the positive voltage output from the battery, shown as B+502, and a fixed reference voltage, shown as Vref 504, against which the battery voltage is compared. The fixed reference voltage may be internally generated by the comparator 508 or generated externally and provided to circuit 500, in different embodiments.

In another embodiment, a more complex power-on circuit may be implemented for generating a power-on signal. For example, a power-on circuit may gather more or different types of information from the battery and elsewhere, which may be processed by a microcontroller to perform a more intelligent or more context-aware assessment of the capacity of the corresponding battery. FIG. 5B is a schematic of a second power-on circuit 550, in accordance with such an embodiment. In this example embodiment, circuit 550 includes a voltage regulator 535 and a microcontroller 530, which determines when and if to issue a power-on signal based on multiple outputs of the battery 525. More specifically, microcontroller 530 receives as inputs, from the battery 525, the positive voltage output from the battery, shown as B+ 526, the thermal monitor output line from the battery, shown as Th signal 527, and battery data 528 from the battery. Battery data 528 may include data representing any of a variety of operating parameters of battery 525 including, but not limited to the state-of-charge of the battery, the battery type, the battery topology, the available capacity of the battery, the peak charging capacity of the battery, the present charging capacity of the battery, a nominal voltage range for the battery, the temperature of the battery, an indication of the age of the battery, the number of charge-discharge cycles the battery has experienced, or a measure of impedance.

In this example, microcontroller 530 is configured to receive analog signals from the battery, such as voltage signal B+ 526 and thermal signal Th 527, at inputs to one or more analog-to-digital convertors (ADCs), and is configured to receive battery data 528 at a digital input. Microcontroller 530 may include processing logic or circuitry to determine, based at least in part on these inputs, whether a predetermined threshold condition for issuing a power-on signal 522 to the corresponding host processing unit or the power management unit, shown as host or PMIC 520, has been met or exceeded. In response to receiving power-on signal 522, the power management unit 520 may cause power to be turned on in at least a portion of the corresponding battery-powered device. For example, enough of the device may be turned on that the host processing unit of the device will be able to execute program instructions to perform some or all of the methods described herein. In this example, voltage regulator 535, which is placed between battery 525 and microcontroller 530, negates the need for the host or PMIC 520 to be turned on in order for microcontroller 530 to function. In this example, the input to voltage regulator 535 is branched off of voltage signal B+ 526, and the output of voltage regulator 535 is routed to the digital and analog supply pins of microcontroller 530, shown as VCC. This allows at least the processing logic or circuitry of microcontroller 530 that issues power-on signal 522 to operate prior to power being provided to host or PMIC 520.

Figure 6A:
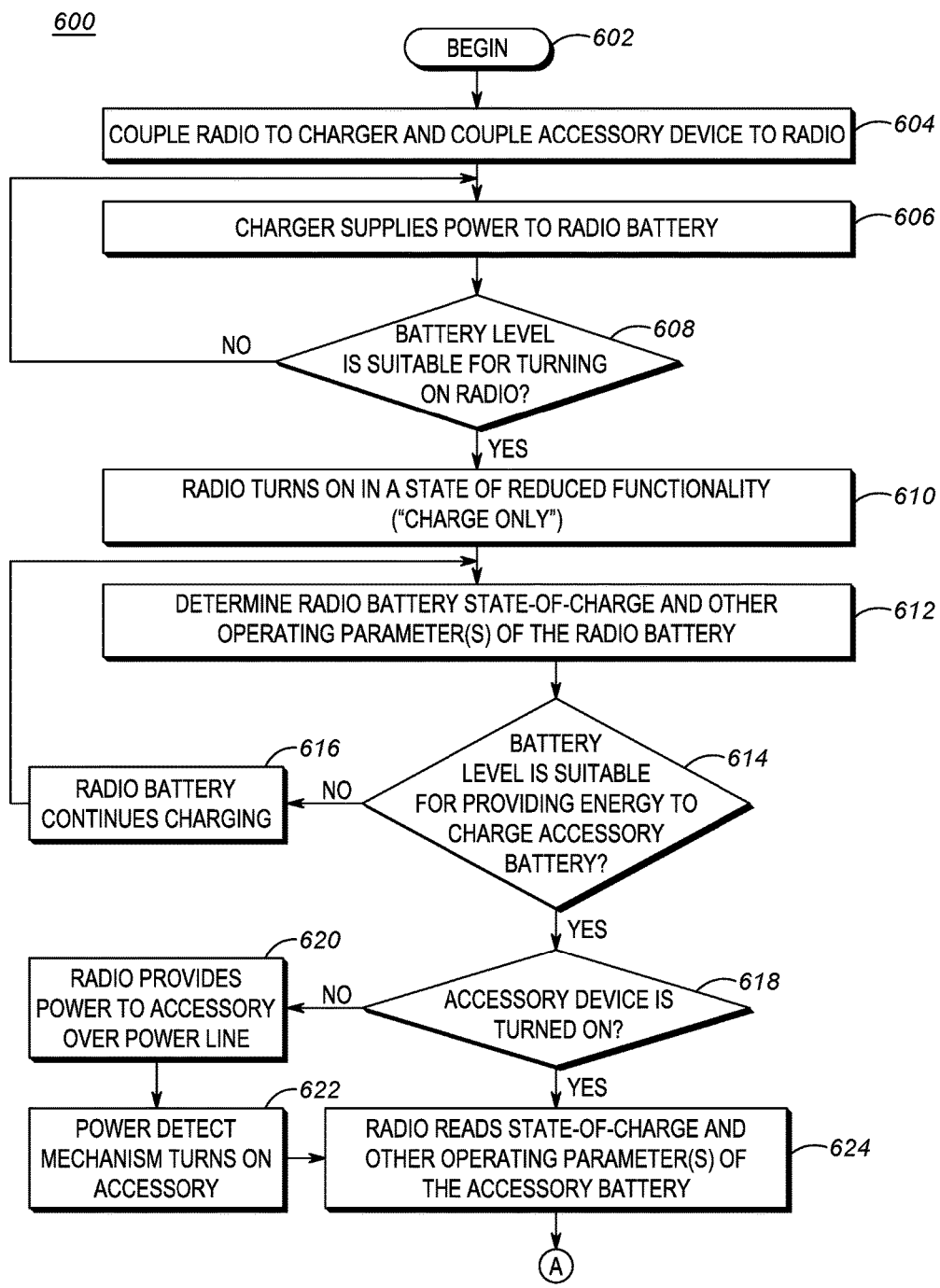
FIGS. 6A-6B are flowcharts illustrating a method of simultaneously charging a primary battery-powered device and a battery-powered accessory, in accordance with some embodiments.
Figure 6B:
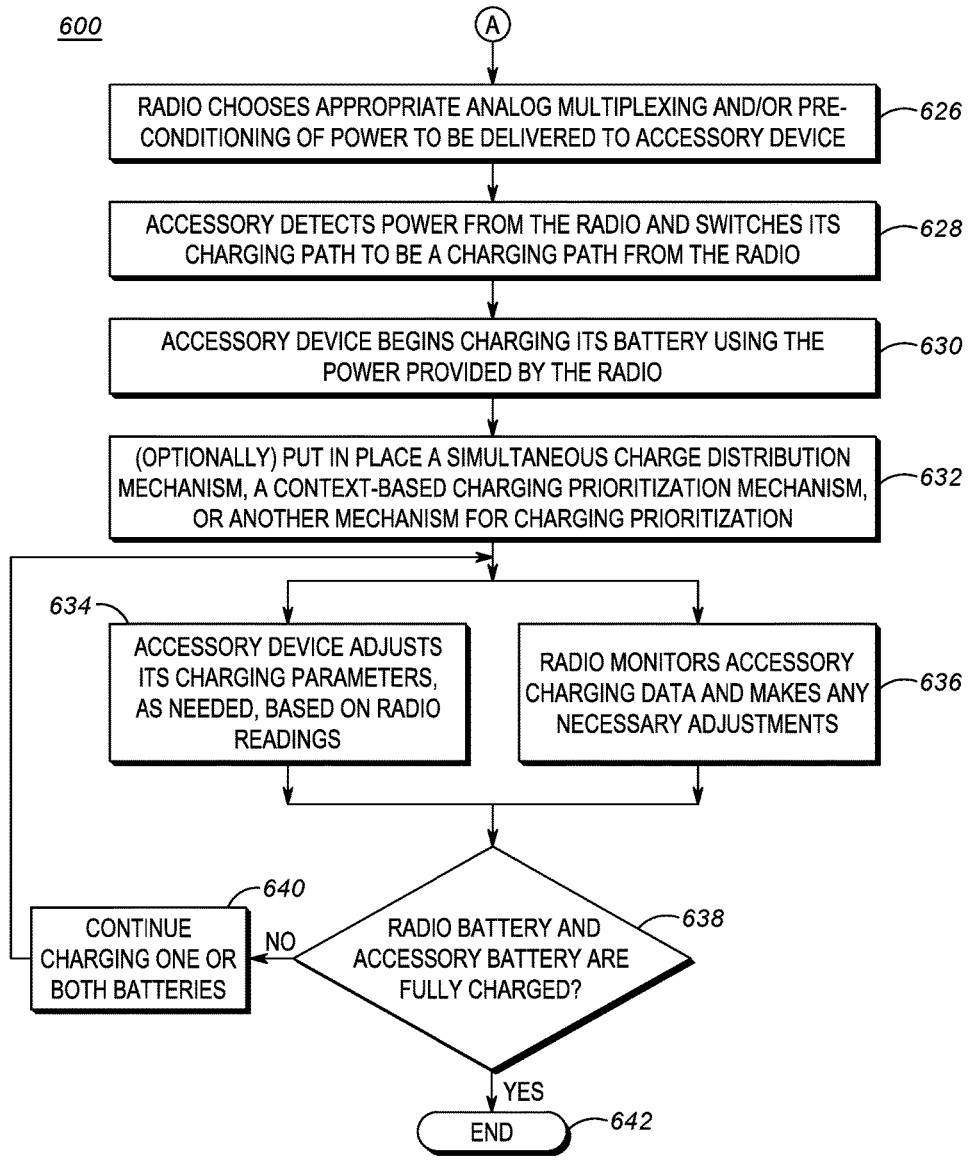

Referring now to FIGS. 6A and 6B, there is provided a flow diagram of an example method 600 for simultaneously charging a primary battery-powered device and a battery-powered accessory device, in accordance with some embodiments. While a particular order of operations is indicated in FIGS. 6A and 6B for illustrative purposes, the timing and ordering of such operations may vary where appropriate without negating the purpose and advantages of the examples set forth in detail throughout the remainder of this disclosure. In this example embodiment, the respective host processing units of a battery-powered radio and a battery-powered accessory device may execute different portions of method 600 following a power-on or reset event, at some predetermined periodic time period thereafter, in response to a trigger raised locally at the battery-powered radio via an internal process or via an input interface, in response to receiving a trigger from the battery-powered accessory device to which the battery-powered radio is communicatively coupled, or in response to detecting that the battery-powered accessory device has been communicatively coupled to the battery-powered radio, in different embodiments.

In this example embodiment, method 600 begins with block 602 in FIG. 6A and continues with block 604, where a radio is coupled to a charger and a battery-powered accessory device is coupled to the radio. The charger may be a multi-unit charger, a single-unit charger, a vehicular charger, a wall charger, or any other suitable type of external charger to which the radio may be coupled in order to charge its primary battery. At block 606, the charger begins supplying power to the battery of the radio.

In this example, at block 608, it is determined whether or not the battery level of the radio is suitable for turning on the radio. If so, method 600 continues at block 610. Otherwise, method 600 returns to block 606. At block 610, the radio is turned on and placed in a state of reduced functionality, such as a "charge only" mode. For example, if, when the radio is coupled to the charger, it is in an OFF state, but the radio battery is already charged to a predetermined minimum level at which the radio can be turned on, then a power-on circuit may issue a power-on signal to the host processing unit or power management unit of the radio to cause the radio to be turned on. In various embodiments, the power-on circuit may be similar to one illustrated in FIGS. 5A or 5B and described above, or another type of power-on circuit. The threshold condition for turning on the radio and placing it in the charge-only state may be specified in terms of an absolute or relative voltage level or a charge percentage, in different embodiments.

In some embodiments, a power-on circuit may trigger the turn-on event in response to data activity from the battery, in response to detecting a requisite voltage level, or in response to some other digital or analog signal or a combination thereof. In some embodiments, a threshold condition for issuing a power-on signal may be fixed. For example, the threshold condition may be fixed in hardware within the power-on circuit. In other embodiments, the threshold condition for issuing a power-on signal may be configurable and may be changeable during operation of the system. For example, the threshold condition for issuing a power-on signal may be programmed by instructions executing on the host processing unit of the radio. In one embodiment, an initial default threshold condition, such as a relatively conservative threshold condition, may be fixed in the hardware, but the threshold condition used during operation may be subsequently modified based on changing conditions. In some embodiments, the "charge only" state may be a state of reduced-functionality that is dedicated for radio charging purposes only. Therefore, the minimum battery level required to enter this state may be even lower than a default minimum battery level required to enter a reduced functionality state in which one or more basic radio functions are enabled.

Following the operation shown at block 610, the radio, now in the charge-only state, may be ready to assume a charging role for its own battery, but may not be ready to condition and relay energy from the charger or from its primary battery to the internal charger on the accessory device for the accessory battery. In other words, the "charge-only" state of the radio may be a low power state in which only the minimum required function needed for charging is enabled. At block 612, the radio battery's state-of-charge and one or more other operating parameters of the radio battery are determined, such as by the host processing unit of the radio reading these parameters from a memory of the radio battery.

In at least some embodiments, a second radio battery threshold condition may be set and this second threshold condition may be used to determine whether the state-of-charge of the radio battery is sufficient to allow the radio to provide energy to the accessory device for charging its accessory battery. Until the radio battery reaches or exceeds this second threshold condition, all of the charging capacity of the external charger may be directed to the charging of the radio battery, and only the minimum functionally of the radio required to enable and monitor the charging of the radio battery may be powered by the radio battery or the external charger. The second threshold condition may be specified in terms of an absolute or relative voltage level or a charge percentage, in different embodiments. At block 614, it is determined whether or not the battery level is suitable for providing energy to charge the accessory battery. If so, method 600 continues at block 618. Otherwise, method 600 continues at block 616. At block 616, the radio battery continues charging, and method 600 returns to block 612.

At block 618, it is determined whether or not the battery-powered accessory device is turned on. If so, method 600 continues at block 624. Otherwise, method 600 continues at block 620, where the radio provides power to battery-powered accessory device over a power line of a cable that couples the radio to the battery-powered accessory device, thus enabling a power path from the radio to the accessory. When the accessory is in the OFF state, a mechanism to either partially or fully turn the accessory on may be engaged, assuming a tethered connection of the radio to the accessory via cable. The radio or accessory may use any of a variety of power detection mechanisms to determine whether or not the accessory is turned on including, but not limited to, a power detection mechanism based on the Vbus line defined by the USB2.0 standard, a power detection mechanism based on information exchanged on one or more data lines of the cable that couples the radio to the battery-powered accessory device, a power detection mechanism implemented in logic or circuitry on one or both devices, or a power detection mechanism that monitors an analog signal to determine whether power is being sourced from the radio for charging purposes. This information may be fed-forward from the radio, which is acting as an energy host device, to the accessory device, which is the recipient of the energy, to provide feedback to the radio. The radio may then choose whether or not to modulate its power conditioning in order to optimize the overall efficiency of the path for charging the accessory from the radio.

At block 622, a power detection mechanism turns the accessory on, after which method 600 continues at block 624. At block 624, the radio reads state-of-charge information and other operating parameters of the accessory battery, after which method 600 continues at label (A) in FIG. 6B. For example, the radio, which is acting as the host charging device, may obtain multiple operating parameters of the accessory battery read from the accessory battery data stored in a memory of the accessory battery. The accessory battery data may be obtained by the radio over one or more data lines of the cable that couples the radio to the battery-powered accessory device. For example, a 1-wire, I$^2$C, or USB compliant cable or any other appropriate mechanism may be employed to convey operating parameters of the accessory battery to the host processing unit of the radio. Once the accessory is in the charging state, energy from the battery node of the radio device is diverted to an analog multiplexor in the radio, which then provides power to the dependent accessory's battery. For example, the radio, acting as the host device, may use the information obtained from the accessory device, including operating parameters of the accessory battery or the operating parameters of its primary battery, to control the analog multiplexor to direct power provided by the primary battery, unconditioned power provided by the external battery charger, or power provided by the external battery charger and pre-conditioned by the radio to the internal accessory charger for the accessory battery. In at least some embodiments, providing power from the primary may be most efficient method for providing power to the accessory for charging its accessory battery.

At block 626 in FIG. 6A, the radio chooses the appropriate analog multiplexing and optional pre-conditioning of the power to be delivered to the accessory device. As previously noted, the power provided to the accessory device may or may not be pre-conditioned through an SMPS regulator on the radio. In one example, such pre-conditioning may allow a device with a battery that includes two cells in series to provide energy to an accessory with a single-cell battery in a format that is useful to the latter. The SMPS regulator may be bypassed until such time that the voltage of the accessory battery equals the terminal voltage of the radio. In some embodiments, engaging the SMPS regulator at this time may allow the radio to continue to charge the accessory battery to a state of charge in which its terminal voltage exceeds that of the battery of the radio. In certain situations, this approach may be used in the field to assure proper energy balancing between the radio and the accessory device.

At block 628, the accessory device detects power from the radio and switches its charging path to be a charging path from the radio. At block 630, the accessory device begins charging its battery using the power provided by the radio. At optional block 632, a simultaneous charge distribution mechanism, a context-aware charging prioritization mechanism, or another mechanism for charging prioritization may be put in place. In one example, a prioritization parameter may specify that the radio battery is to be charged to a state-of-charge that will last for eight hours before the radio begins charging the accessory. In another example, a charging distribution parameter may specify that the charging power is to be distributed between the radio and the accessory device in such a way that they finish charging at approximately the same time.

In some embodiments, the host processing unit on the radio may implement a context-aware charging prioritization mechanism, in which its decision-making is based not only on the respective physical aspects of the batteries of the radio and the accessory device, but also on the context in which one or both of these devices is operating. For example, when the accessory device includes a video camera that is running, the host processing unit on the radio may decide to send more power to the accessory device to charge its battery than would otherwise be the case based on the current operating parameters of the accessory battery. This balancing may be performed regardless of whether or not the radio is coupled to an external charger. In this example, the host processing unit or power management unit on the radio may disable or reduce the power provided to non-essential functions of the radio in response to determining that charging the accessory battery is the highest priority in the current operating context of the radio and the accessory device. For example, the host processing unit or power management unit on the radio may turn off the display, lower the volume, or disable other input/output functions on the radio that are unrelated to the operation of the accessory device. In some embodiments, such determinations may be made based, at least in part, on a determination of the battery-energy remaining one or more of the batteries and on an amount of energy consumed by various functionality features of the radio and the accessory device.

In some embodiments, the host processing unit on the radio may be configured to provide feedback on the radio display indicating the distribution of the power or current between the radio and an accessory device coupled to the radio or how it is being used on those devices. In one such embodiment, a user may be prompted to take action to reduce the power consumption of one of the devices when the context in which the devices are operating is such that the other device has a higher priority with respect to battery charging or power consumption. For example, the user may be prompted to turn off the display, lower the volume, or disable other input/output functions on the lower priority device that are unrelated to the operation of the higher priority device.

Following block 630 or optional block 632, method 600 continues to blocks 634 and 636, substantially in parallel. At this point, given that the radio is coupled to an external charger, the batteries on both the radio and the accessory device will be engaged in simultaneous charging. While the batteries are charging, state-of-charge information for the accessory battery may be fed back to the host processing unit on the radio, which controls the SMPS regulator for prioritization and handling purposes, over one or more data lines of the cable through which the devices are coupled to each other. Alternatively, information may be fed back to the host processing unit on the radio via a voltage sense line to the terminal of the accessory battery via the tethering cable. This information may be combined with real-time knowledge of the current drain flowing either directly from the battery on the radio or through the SMPS regulator of the radio, when the latter is employed. This mechanism may complete a feedback loop that allows the radio, as the primary battery-powered device, to optimize power delivery to an internal battery charger of the accessory.

At block 634, the accessory device adjusts its charging parameters, as needed, based on readings obtained from the radio. Similarly, at block 636, the radio monitors the charging data for the accessory battery and makes any necessary adjustments. For example, in some embodiments, in order to adjust the energy balance while simultaneously charging the radio and the accessory, the portion of the current delivered to the accessory may be modified. For example, in some embodiments, there may be a maximum amount of current that the external charger can source. The host processing unit on the radio may determine an initial budgeting of this maximum charge current capability of the charger between the two devices based on a first set of operating parameters for their respective batteries, allocating a first portion of the available current to charging the battery or performing other operations on the radio and allocating a second portion of the available current to the accessory for charging its battery. Subsequently, such as in response to a change in the operating context of the devices, in response to a change in battery conditions or loading, or in response to obtaining updated operating parameters for one or both batteries, the relative portions of the available current allocated to each of the devices may be modified. In some embodiments, the available current may budgeted between the devices in a manner that ensures that the sum of the charging currents between the two devices does not exceed the capacity of the charger. In some embodiments, the available current may budgeted between the devices in a manner that ensures that the two devices finish charging at approximately the same time. Note that this may involve charging the devices at different rates, depending on the respective operating parameters of their batteries, including the respective state-of-charge of their batteries, the contexts in which they are operating, or any applicable parameters specifying charging priorities or a charging distribution.

Until, at block 638, it is determined that both the radio battery and the accessory battery are fully charged, and assuming that the radio is still coupled to the charger and the accessory is still coupled to the radio, the method may include continuing to charge one or both batteries, at block 640, and making adjustments, as needed, at parallel blocks 634 and 636. When, at block 638, it is determined that both the radio battery and the accessory battery are fully charged, method 600 may end at block 642.

While systems, methods, and apparatus for simultaneously charging primary battery-powered devices and battery-powered accessories thereof have been described herein in terms of specific embodiments, including several embodiments in which the host device is a two-way radio and the accessory is a video speaker microphone, a body camera, or another accessory primarily used by first responders, the disclosed techniques may be applied to simultaneously charge any portable battery-powered host devices, including other types of portable communication devices or, more generally, any other type of host device to which accessories may be tethered, and any active battery-powered accessories for those host devices that can be coupled to the host devices for charging. For example, in various embodiments, any of a variety of interchangeable accessories may be tethered to a battery-powered host device that may employ the disclosed techniques, including, but not limited to, radio earpieces and earpiece microphones, mobile microphones, receivers, remote speaker microphones, video speaker microphones or body cameras, radio headsets, surveillance headsets, push-to-talk pods, environmental hazard sensors, biometric sensors, fingerprint sensors, activity trackers, weapon status sensors, head-mounted displays, body-worn sensors, and the like, or wearable articles of clothing on which multiple sensors or other accessories are mounted and through which the sensors and other accessories may be collectively charged.

In addition, the systems, methods, and apparatus described herein may be employed in fields other than those that employ first responders, including, but not limited to, hospitals, restaurants, warehouses, retail stores, schools, amusement parks, sports and entertainment venues, the petroleum industry, and the like for implementing efficient, intelligent, and cost-effective charging of pairs of battery-powered host devices and battery-powered accessories, and for the prioritization of the charging of these devices.

While several example systems are described herein that include particular types of batteries having particular topologies, such as single-cell batteries, or batteries with two cells in series or in parallel, the techniques described herein may, more generally, be employed in systems in which the host devices and accessories include batteries having any of a variety of battery types, including batteries having different chemical compositions and topologies than those included in these example embodiments. For example, some systems may include three-cell or four-cell batteries in various configurations instead of, or addition to, single-cell or two-cell batteries. In different embodiments, the primary battery on a host device may be of the same type and topology as the battery on its accessory, or may be of a different type or technology than the battery on its accessory.

Figure 7:
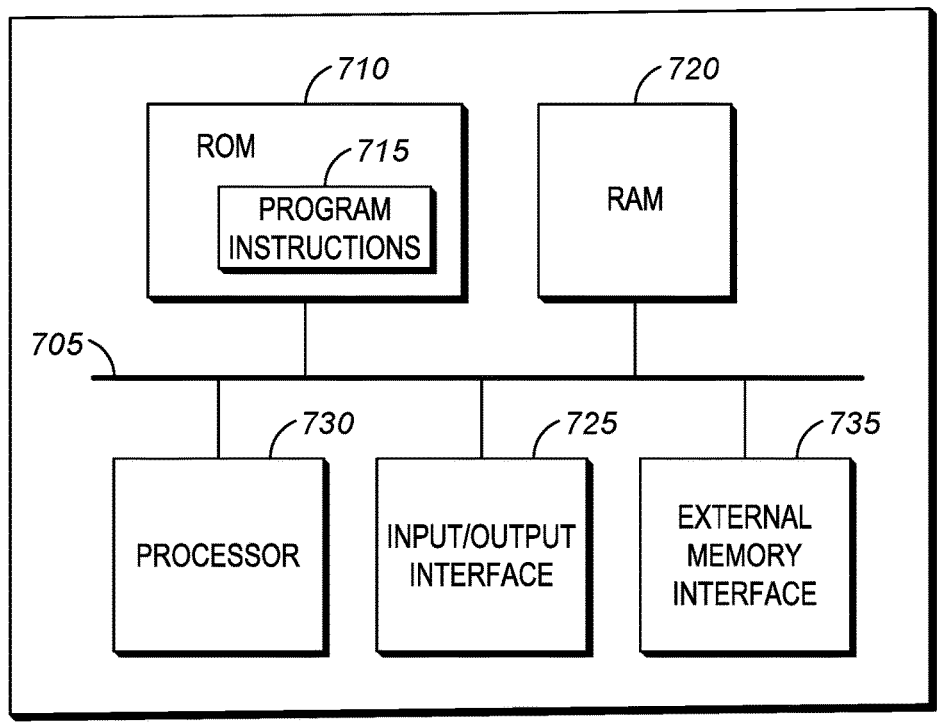
FIG. 7 is a block diagram illustrating an example host processing unit, in accordance with some embodiments.

As described herein, both a primary battery-powered device and a battery-powered accessory may include a respective host processing unit that makes decisions about whether, when, and how to perform charging operations for the batteries of these devices. FIG. 7 is a block diagram illustrating an example host processing unit 700, in accordance with some embodiments. In some embodiments, host processing unit 700 may be configured to perform the functions of a host processing unit of a primary battery-powered device through which a battery-powered accessory device may be charged. In other embodiments, host processing unit 700 may be configured to perform the functions of a host processing unit of a battery-powered accessory device whose battery may be charged by power provided by a primary battery-powered device. For example, the functionality of radio host 416 or accessory host 454 illustrated in FIG. 4 may be implemented by a respective instance of host processing unit 700. As illustrated in this example embodiment, host processing unit 700 may include a Read Only Memory (ROM) 710, a Random Access Memory (RAM) 720, an electronic processor 730, an input/output interface 725, and an external memory interface 735, all of which are coupled to a system bus 705 through which they communicate with each other. In various embodiments, the electronic processor 730 may include a microprocessor, a microcontroller, a system-on-chip, a field-programmable gate array, a programmable mixed-signal array, or, in general, any system or sub-system that includes nominal memory and that is capable of executing a sequence of instructions in order to control hardware.

In this example embodiment, ROM 710 stores program instructions 715, at least some of which may be executed by the electronic processor 730 to perform the methods described herein. For example, any or all of the operations of method 300 illustrated in FIG. 3 or method 600 illustrated in FIGS. 6A and 6B may be performed by program instructions executing on a host processing unit 700 that serves as a primary host processing unit, such as on a host radio, or on a host processing unit 700 that serves as an accessory host processing unit, such as on a radio accessory. In some embodiments, program instructions 715 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. In some embodiments, program instructions 715 may include program instructions that when executed on the host processing unit 700 implement other functionality features of the primary device or its accessory.

In this example embodiment, RAM 720 may, from time to time, store data representing state-of-charge information or other operating parameters of a primary battery or an accessory battery to be used in controlling the simultaneous charging of these batteries, as described herein. In some embodiments, RAM 720 may also store data used in performing other functions of the primary device or its accessory. In this example embodiment, input/output interface 725 may include one or more analog input interfaces, such as one or more A/D convertors, or digital interfaces for receiving signals or data representing state-of-charge information or other operating parameters of a primary battery or an accessory battery. Input/output interface 725 may also include interfaces through which host processing unit 700 may be coupled to other elements of a primary battery-power device or a battery-powered accessory device. For example, host processing unit 700 may be coupled to a power management unit, an analog multiplexor, voltage sense circuitry, or a power-on circuit, such as those described herein, over input/output interface 725. In addition, host processing unit 700 may be coupled to input/output devices that implement other functionality features of the primary device or its accessory (not shown in FIG. 7), such as a microphone, a video camera, a display, a speaker, one or more sensors, and the like over input/output interface 725.

External memory interface 735 may include one or more interfaces through which host processing unit 700 may be coupled to an external memory (not shown in FIG. 7). Such an external memory may include, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

In at least some embodiments, the systems, methods, and apparatus described herein for simultaneously charging a primary battery-powered device, such as a two-way radio, and a battery-powered accessory, such as a radio accessory, that is tethered to the primary device may allow devices having batteries of different types or having different nominal voltages to be charged from a single charger. In some embodiments, the primary battery-powered device may also be used to charge the battery-powered accessory during operation, such as when the primary battery-powered device is not coupled to an external charger. A processing unit on the primary device may obtain state-of-charge information and other operating parameters of the batteries of the two devices and may determine whether and when to provide power to the accessory to charge its battery based on that information.

The primary device may select its own battery, power provided by a charger to which it is coupled, or power that is pre-conditioned by the primary device for compatibility with the accessory as the source of charging energy provided to the accessory to charge its battery. The systems described herein may employ configurable mechanisms for prioritizing the charging of the primary battery-powered device and the battery-powered accessory and for intelligently balancing the distribution of charge between these two devices. For example, respective processing units on the two devices may adjust charging parameters to perform energy balancing while the batteries are simultaneously charged, based on operating parameters of the batteries, operating contexts of the devices, a charging prioritization scheme, or a current distribution scheme. In this example, adjusting the charging parameters may include modifying the relative portions of available current allocated to each device. The techniques described herein may provide flexibility for accessory charging and may reduce costs associated with the use of dedicated accessory chargers.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic device, comprising:
   a primary battery coupler to receive a primary battery;
   an accessory interface configured to support a wired connection to a power port, a ground port, and at least one data channel of a battery-powered accessory;
   a processing unit including circuitry to:
     obtain, from the battery-powered accessory via the data channel, a plurality of operating parameters of an accessory battery of the battery-powered accessory, the operating parameters of the accessory battery including a state-of-charge of the accessory battery;
     initiate, dependent on the state-of-charge of the accessory battery, an operation to charge the accessory battery;
     determine, dependent on the plurality of operating parameters of the accessory battery, a charging voltage to be applied to charge the accessory battery; and
   circuitry to:
     provide, via the wired connection, power to the battery-powered accessory to charge the accessory battery, wherein the power provided to the battery-powered accessory is dependent on the determined charging voltage.

2. The electronic device of claim 1, wherein:
   the electronic device further comprises a connector through which the primary battery is to be coupled to a battery charger;
   the processing unit further includes circuitry to determine a source of the power provided to the battery-powered accessory to charge the accessory battery dependent on the determined charging voltage.

3. The electronic device of claim 2, wherein:
   the processing unit further includes circuitry to:
     determine whether or not the charging voltage to be applied to charge the accessory battery is within a nominal voltage range for the primary battery;
     determine whether or not the charging voltage to be applied to charge the accessory battery is within a nominal voltage range for power supplied by the battery charger;
   to provide power to the battery-powered accessory to charge the accessory battery, the electronic device further comprises circuitry to:
     provide, responsive to a determination that the charging voltage to be applied to charge the accessory battery is within the nominal voltage range for the primary battery, power from the primary battery to the battery-powered accessory;
     provide, responsive to a determination that the charging voltage to be applied to charge the accessory battery is within the nominal voltage range for power supplied by the battery charger and that the electronic device is coupled to the battery charger, power from the battery charger to the battery-powered accessory.

4. The electronic device of claim 1, wherein:
   the electronic device further comprises a connector through which the primary battery is to be coupled to a battery charger;
   the processing unit further includes circuitry to:
     determine whether or not the charging voltage to be applied to charge the accessory battery is within a nominal voltage range for power supplied by the battery charger;
   to provide power to the battery-powered accessory to charge the accessory battery, the electronic device further comprises circuitry to:
     condition power provided by the battery charger to generate power that is substantially equivalent to the charging voltage to be applied to charge the accessory battery, responsive to a determination that the charging voltage to be applied to charge the accessory battery is not within a nominal voltage range for power supplied by the battery charger and that the electronic device is coupled to the battery charger; and
     provide the conditioned power to the battery-powered accessory.

5. The electronic device of claim 1, wherein:
   the processing unit further includes circuitry to:
     determine one or more operating parameters of the primary battery, the operating parameters of the primary battery including a state-of-charge of the primary battery;
     determine, dependent on the operating parameters of the primary battery, whether or not the primary battery exceeds a first threshold condition;
   initiation of the operation to charge the accessory battery is further dependent on a determination that the primary battery exceeds the first threshold condition.

6. The electronic device of claim 5, wherein:
   the operating parameters of the accessory battery or the operating parameters of the primary battery including a battery type, a battery topology, an available capacity, a peak charging capacity, a present charging capacity, a nominal voltage range, a temperature, an indication of battery age, a number of charge-discharge cycles, or an impedance value.

7. The electronic device of claim 5, wherein:
   the processing unit further includes circuitry to:
     determine, dependent on the operating parameters of the primary battery or the operating parameters of the accessory battery, a first portion of available current to be allocated to one or more operations on the electronic device and a second portion of the available current to be delivered to the battery-powered accessory; and
   to provide power to the battery-powered accessory to charge the accessory battery, the electronic device further comprises circuitry to deliver the second portion of the available current to the battery-powered accessory.

8. The electronic device of claim 7, wherein:
   determination of the first portion of the available current and the second portion of the available current is further dependent on:
     a parameter of the electronic device that controls a relative priority of respective charging operations for the electronic device and the battery-powered accessory;
     a parameter of the electronic device that controls a simultaneous distribution of current for the respective charging operations for the electronic device and the battery-powered accessory;
     an operating context of the electronic device; or
     an operating context of the battery-powered accessory.

9. The electronic device of claim 7, wherein:
   the processing unit further includes circuitry to:
     obtain, from the battery-powered accessory via the data channel during delivery of the second portion of the available current to the battery-powered accessory, one or more updated operating parameters of the accessory battery; and determine, dependent on one or more updated operating parameters of the primary battery or the updated operating parameters of the accessory battery, that the first and accessory portions of the available current are to be modified relative to each other; and
the electronic device further comprises circuitry to:
modify the portion of the available current delivered to the battery-powered accessory.

10. The electronic device of claim 5, wherein:
the electronic device further comprises a connector through which the primary battery is to be coupled to a battery charger;
the processing unit further includes circuitry to:
determine, dependent on the operating parameters of the primary battery or the operating parameters of the accessory battery, a first portion of current provided by the battery charger to be used to charge the primary battery and a second portion of the current provided by the battery charger to be delivered to the battery-powered accessory; and
to provide power to the battery-powered accessory to charge the accessory battery, the electronic device further comprises circuitry to deliver the second portion of the current provided by the battery charger to the battery-powered accessory.

11. The electronic device of claim 5, wherein:
the first threshold condition specifies a level of charge for the primary battery below which the battery-powered accessory is not to be charged;
the electronic device further comprises circuitry to:
determine, dependent on the operating parameters of the primary battery, whether or not the primary battery exceeds a second threshold condition, the second threshold condition to specify a level of charge for the primary battery less than the level of charge specified for the first threshold condition;
responsive to a determination that the state-of-charge for the primary battery exceeds the second threshold condition and does not exceed the first threshold condition:
place the electronic device in a state of reduced functionality;
maintain the electronic device in the state of reduced functionality while the state-of-charge for the primary battery is below the level of charge specified by the first threshold condition;
enable the primary battery to be charged by a battery charger while in the state of reduced functionality.

12. A method of operating a battery-powered device, comprising:
obtaining, from a battery-powered accessory coupled to the battery-powered device through a wired connection to a power port, a ground port, and at least one data channel of the battery-powered accessory, a plurality of operating parameters of an accessory battery of the battery-powered accessory, the operating parameters of the accessory battery including a state-of-charge of the accessory battery;
initiating, dependent on the state-of-charge of the accessory battery, an operation to charge the accessory battery;
determining, dependent on the plurality of operating parameters of the accessory battery, a charging voltage to be applied to charge the accessory battery; and
providing, via the wired connection, power to the battery-powered accessory to charge the accessory battery, wherein the power provided to the battery-powered accessory is dependent on the determined charging voltage.

13. The method of claim 12, wherein:
the method further comprises determining whether or not the charging voltage to be applied to charge the accessory battery is within a nominal voltage range for the primary battery;
providing power to the battery-powered accessory to charge the accessory battery comprises providing power from the primary battery to the battery-powered accessory in response to determining that the charging voltage to be applied to charge the accessory battery is within the nominal voltage range for the primary battery.

14. The method of claim 12, wherein:
the method further comprises:
determining whether or not the charging voltage to be applied to charge the accessory battery is within a nominal voltage range for power supplied by a battery charger; and
determining whether or not the battery-powered device is coupled to the battery charger;
providing power to the battery-powered accessory to charge the accessory battery comprises providing power from the battery charger to the battery-powered accessory, in response to determining that the charging voltage to be applied to charge the accessory battery is within the nominal voltage range for power supplied by the battery charger and that the battery-powered device is coupled to the battery charger.

15. The method of claim 12, wherein:
the method further comprises:
determining whether or not the charging voltage to be applied to charge the accessory battery is within a nominal voltage range for power supplied by a battery charger; and
determining whether or not the battery-powered device is coupled to the battery charger;
providing, in response to determining that the charging voltage to be applied to charge the accessory battery is not within a nominal voltage range for power supplied by the battery charger and that the battery-powered device is coupled to the battery charger, power to the battery-powered accessory to charge the accessory battery comprises:
conditioning power provided by the battery charger to generate power that is substantially equivalent to the charging voltage to be applied to charge the accessory battery; and
providing the conditioned power to the battery-powered accessory.

16. The method of claim 12, wherein:
the method further comprises:
determining one or more operating parameters of a primary battery of the battery-powered device, the operating parameters of the primary battery including a state-of-charge of the primary battery; and
determining, dependent on the operating parameters of the primary battery, that the primary battery exceeds a threshold condition;
initiating the operation to charge the accessory battery is performed in response to determining that the primary battery exceeds the threshold condition.

17. The method of claim 16, further comprising:
determining, dependent on the operating parameters of the primary battery or the operating parameters of the accessory battery, a first portion of available current to be allocated to one or more operations on the battery-powered device and a second portion of the available current to be delivered to the battery-powered accessory, wherein providing power to the battery-powered accessory to charge the accessory battery comprises delivering the second portion of the available current to the battery-powered accessory;

obtaining, from the battery-powered accessory via the data channel during delivery of the second portion of the available current to the battery-powered accessory, one or more updated operating parameters of the accessory battery;

determining, dependent on one or more updated operating parameters of the primary battery or the updated operating parameters of the accessory battery, that the first and accessory portions of the available current are to be modified relative to each other; and modifying the portion of the available current delivered to the battery-powered accessory.

18. The method of claim 16, wherein:
the battery-powered device is coupled to a battery charger;
the method further comprises determining, dependent on the operating parameters of the primary battery or the operating parameters of the accessory battery, a first portion of current provided by the battery charger to be used to charge the primary battery and a second portion of the current provided by the battery charger to be delivered to the battery-powered accessory; and
providing power to the battery-powered accessory to charge the accessory battery comprises delivering the second portion of the current provided by the battery charger to the battery-powered accessory.

19. The method of claim 16, wherein:
the threshold condition specifies a level of charge for the primary battery;
the method further comprises:
  maintaining the battery-powered device in a state of reduced functionality while the state-of-charge for the primary battery is below the level of charge specified by the threshold condition; and
  enabling the primary battery to be charged by a battery charger while the battery-powered device is in the state of reduced functionality and the battery-powered device is coupled to the battery charger.

20. A system, comprising:
a primary battery-powered device comprising:
  a primary battery coupler to receive a primary battery;
  an accessory interface;
  a primary processing unit; and
  a primary power control circuit;
a battery-powered accessory coupled to the accessory interface of the primary battery-powered device through a wired connection to a power port, a ground port, and at least one data channel of the battery-powered accessory, wherein the battery-powered accessory is one of a plurality of interchangeable battery-powered accessories, and wherein the battery-powered accessory comprises:
  an accessory battery coupler to receive an accessory battery;
  an accessory processing unit; and
  an accessory power control circuit;
wherein the primary processing unit comprises circuitry to:
  obtain, from the battery-powered accessory via the data channel, a plurality of operating parameters of the accessory battery, the operating parameters of the accessory battery including a state-of-charge of the accessory battery;
  initiate, dependent on the state-of-charge of the accessory battery, an operation to charge the accessory battery;
  determine, dependent on the plurality of operating parameters of the accessory battery, a charging voltage to be applied to charge the accessory battery;
wherein the primary power control circuit comprises circuitry to provide, via the wired connection, power to the battery-powered accessory to charge the accessory battery, wherein the power provided to the battery-powered accessory is dependent on the determined charging voltage;
wherein the accessory power control circuit comprises circuitry to charge the accessory battery using the power provided by the primary power control circuit.

21. The system of claim 20, wherein:
the system further comprises a battery charger;
the primary processing unit further comprises circuitry to:
  determine whether or not the charging voltage to be applied to charge the accessory battery is within a nominal voltage range for the primary battery;
  determine whether or not the charging voltage to be applied to charge the accessory battery is within a nominal voltage range for power supplied by the battery charger;
to provide power to the battery-powered accessory to charge the accessory battery, the primary battery-powered device further comprises circuitry to:
  provide, responsive to a determination that the charging voltage to be applied to charge the accessory battery is within the nominal voltage range for the primary battery, power from the primary battery to the battery-powered accessory;
  provide, responsive to a determination that the charging voltage to be applied to charge the accessory battery is within the nominal voltage range for power supplied by the battery charger and that the primary battery-powered device is coupled to the battery charger, power from the battery charger to the battery-powered accessory; and
  responsive to a determination that the charging voltage to be applied to charge the accessory battery is not within a nominal voltage range for power supplied by the battery charger and that the primary battery-powered device is coupled to the battery charger;
  condition power provided by the battery charger to generate power that is substantially equivalent to the charging voltage to be applied to charge the accessory battery; and
  provide the conditioned power to the battery-powered accessory.

22. The system of claim 21, wherein:
the primary processing unit further comprises circuitry to:
  determine, dependent on one or more operating parameters of the primary battery or the operating parameters of the accessory battery, a first portion of available current to be used to charge the primary battery and a second portion of the available current to be delivered to the battery-powered accessory;
  obtain, from the battery-powered accessory via the data channel during delivery of the second portion of the available current to the battery-powered accessory, one or more updated operating parameters of the accessory battery; and determine, dependent on one or more updated operating parameters of the primary battery or the updated operating parameters of the accessory battery, that the first and second portions of the available current are to be modified relative to each other;

the primary power control circuit further comprises circuitry to:

modify the portion of the available current delivered to the battery-powered accessory, responsive to a determination by the primary processing unit that that the first and second portions of the available current are to be modified relative to each other;

the accessory processing unit comprises circuitry to:

obtain, from the primary battery-powered device via the data channel during delivery of the second portion of the available current to the battery-powered accessory, the one or more updated operating parameters of the primary battery; and determine, dependent on the one or more updated operating parameters of the accessory battery or the updated operating parameters of the primary battery, that the first and second portions of the available current are to be modified relative to each other;

the accessory power control circuit further comprises circuitry to:

modify one or more charging parameters for the accessory battery, responsive to a determination by the accessory processing unit that that the first and second portions of the available current are to be modified relative to each other.

* * * * *